United States Patent
Lee et al.

(10) Patent No.: US 10,454,811 B2
(45) Date of Patent: Oct. 22, 2019

(54) APPARATUS AND METHOD FOR DE-JITTER BUFFER DELAY ADJUSTMENT

(71) Applicant: QUALCOMM Incorporated, San Diego, CA (US)

(72) Inventors: Tien-Hsin Lee, San Diego, CA (US); Matthew Zivney, San Diego, CA (US); Manjunatha Kantharaju, Bangalore (IN); Shankar Ganesh Lakshmanaswamy, Bangalore (IN); Kirankumar Bhoja Anchan, San Diego, CA (US); Vasudev Nayak, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 15/644,206

(22) Filed: Jul. 7, 2017

(65) Prior Publication Data
US 2018/0295050 A1 Oct. 11, 2018

(30) Foreign Application Priority Data
Apr. 7, 2017 (IN) .............................. 201741012550

(51) Int. Cl.
*H04L 12/727* (2013.01)
*G06F 3/16* (2006.01)
(Continued)

(52) U.S. Cl.
CPC ............ *H04L 45/121* (2013.01); *G06F 3/165* (2013.01); *H04L 43/04* (2013.01); *H04L 43/087* (2013.01); *H04L 43/0858* (2013.01); *H04L 47/30* (2013.01)

(58) Field of Classification Search
CPC ... H04L 45/121; H04L 47/10; H04L 47/2416; H04L 47/283; H04L 43/04;
(Continued)

(56) References Cited

U.S. PATENT DOCUMENTS 7,817,677 B2 * 10/2010 Black .................... G10L 19/005
370/516
7,826,441 B2 11/2010 Black et al.
(Continued)

FOREIGN PATENT DOCUMENTS

WO 2010149226 A1 12/2010

OTHER PUBLICATIONS

International Search Report and Written Opinion—PCT/US2018/021730—ISA/EPO—dated May 22, 2018.
(Continued)

*Primary Examiner* — Asad M Nawaz
*Assistant Examiner* — Thomas R Cairns
(74) *Attorney, Agent, or Firm* — Toler Law Group, P.C.

(57) ABSTRACT

An apparatus includes de-jitter buffer control circuitry configured to determine an arrival delay value based on previously received audio packets, to identify a receive time of a first audio packet of a talk spurt, to determine an offset value of the first audio packet based on the receive time and the arrival delay value, and to adjust a target delay value associated with a de-jitter buffer based on the offset value. The apparatus also includes a de-jitter buffer configured to buffer the first audio packet based on the adjusted target delay value.

30 Claims, 8 Drawing Sheets

(51) Int. Cl.
*H04L 12/26* (2006.01)
*H04L 12/835* (2013.01)

(58) Field of Classification Search
CPC ... H04L 43/0858; H04L 43/087; H04L 47/56; H04L 47/30; G06F 3/165
See application file for complete search history.

(56) References Cited

U.S. PATENT DOCUMENTS

| | | | | |
|---|---|---|---|---|
| 8,200,286 B2* | 6/2012 | Molnar | ................ | H01Q 1/246 |
| | | | | 455/562.1 |
| 8,279,884 B1* | 10/2012 | Narasimha | .............. | H04L 47/22 |
| | | | | 370/410 |
| 8,594,126 B2* | 11/2013 | Stoica | ................... | H04L 47/225 |
| | | | | 370/412 |
| 9,882,818 B2* | 1/2018 | Shao | .................... | H04L 43/087 |
| 10,049,681 B2* | 8/2018 | Sinder | .................. | G10L 19/167 |
| 10,049,682 B2* | 8/2018 | Atti | ........................ | G10L 19/167 |
| 10,135,707 B2* | 11/2018 | Sung | .................... | H04L 43/0858 |
| 2010/0177734 A1* | 7/2010 | Fujita | .................... | H04W 36/02 |
| | | | | 370/331 |
| 2014/0226476 A1* | 8/2014 | Bertze | ..................... | H04L 47/30 |
| | | | | 370/230.1 |
| 2015/0092585 A1 | 4/2015 | Shao et al. | | |
| 2015/0172197 A1 | 6/2015 | Sun et al. | | |
| 2015/0350099 A1 | 12/2015 | Sun et al. | | |
| 2016/0345219 A1 | 11/2016 | Brisebois et al. | | |
| 2017/0034026 A1 | 2/2017 | Li et al. | | |
| 2017/0245184 A1* | 8/2017 | Nagesh Shetigar | ..... | H04J 11/00 |

OTHER PUBLICATIONS

Sakuray F., et al., "An Efficient Buffer Delay Correction Algorithm to VoIP", AICT 2015, The Eleventh Advanced International Conference on Telecommunications, Jun. 2015, pp. 107-112.

* cited by examiner

APPARATUS AND METHOD FOR DE-JITTER BUFFER DELAY ADJUSTMENT

I. CROSS-REFERENCE TO RELATED APPLICATIONS

The present application claims priority from India Provisional Patent Application No. 201741012550 entitled "APPARATUS AND METHOD FOR DE-JITTER BUFFER DELAY ADJUSTMENT," filed Apr. 7, 2017, the contents of which are incorporated by reference herein in their entirety.

II. FIELD

The present disclosure is generally related to processing audio packets.

III. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets via wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

In order to enable a conversation between users of different devices, a source device receives an input audio signal (e.g., user speech), generates audio packets based on the input audio signal, and transmits the audio packets to a receiving device via a network, such as a packet-switched network. Because one or more audio packets are transmitted separately from other audio packets, delays (e.g., network delays) associated with the packet-switched network may vary between audio packets and, in some situations, may result in out of order reception at the receiving device. The variation in the reception delay is referred to as jitter.

A de-jitter buffer at a device may enable the device to receive audio packets (either with or without variation in delays, and may be in order or out of order). The de-jitter buffer also enables the device to play out a set of the audio packets in the correct order and with correct time relation within the same talk spurt by delaying (according to a target delay) play out of one or more audio packets. However, the target delay may not sufficiently account for variations in network delays. For example, the target delay may be unnecessarily long for certain talk spurts, which increases end-to-end delay and degrades user experience. As another example, the target delay may not be long enough to prevent underflow conditions for some talk spurts. Underflow occurs when a buffer does not store a particular next audio packet to be played out as a series of audio packets.

IV. SUMMARY

In a particular aspect, an apparatus includes de-jitter buffer control circuitry configured to determine an arrival delay value based on previously received audio packets, to identify a receive time of a first audio packet of a talk spurt, to determine an offset value of the first audio packet based on the receive time and the arrival delay value, and to adjust a target delay value associated with a de-jitter buffer based on the offset value. The apparatus also includes a de-jitter buffer configured to buffer the first audio packet for a duration based on the adjusted target delay value.

In another particular aspect, a method includes determining an arrival delay value based on previously received audio packets and identifying a receive time of a first audio packet of a talk spurt. The method further includes determining an offset value of the first audio packet based on the receive time and the arrival delay value. The method also includes adjusting a target delay value associated with a de-jitter buffer based on the offset value.

In another particular aspect, an apparatus includes means for determining an arrival delay value based on previously received audio packets and means for identifying a receive time of a first audio packet of a talk spurt. The apparatus further includes means for determining an offset value of the first audio packet based on the receive time and the arrival delay value. The apparatus also includes means for adjusting a target delay value associated with means for buffering, the target delay value adjusted based on the offset value.

In another particular aspect, a non-transitory, computer readable medium includes instructions that, when executed by a processor, cause the processor to perform operations including determining an arrival delay value based on previously received audio packets and identifying a receive time of a first audio packet of a talk spurt. The operations further include determining an offset value of the first audio packet based on the receive time and the arrival delay value. The operations also include adjusting a target delay value associated with means for buffering, the target delay value adjusted based on the offset value.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
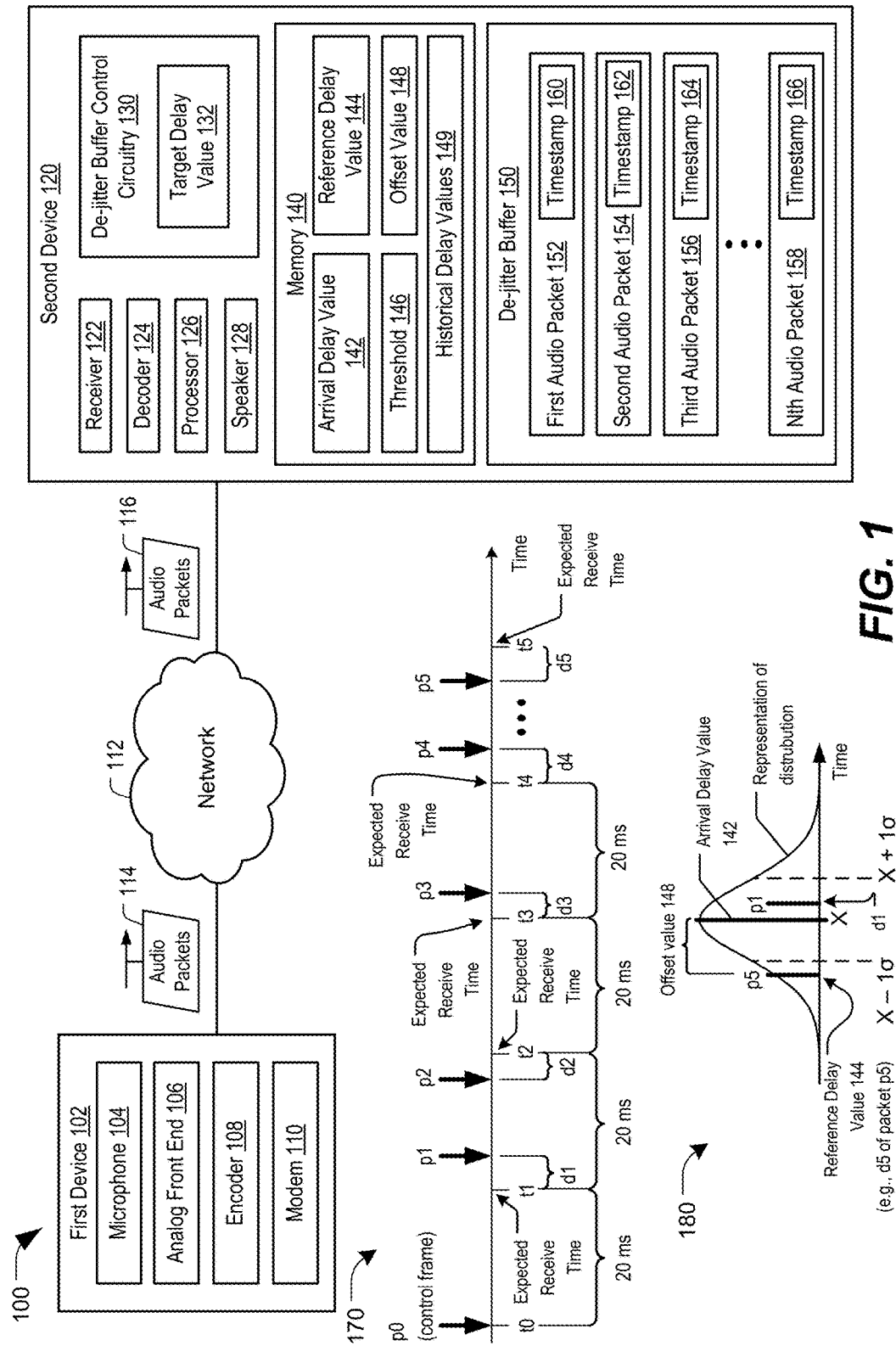
FIG. 1 is a block diagram of a particular illustrative aspect of a system to adjust a target delay value of a de-jitter buffer.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, calculating, estimating, or determining the parameter (or the signal) or may refer to using, selecting, or accessing the parameter (or signal) that is already generated, such as by another component or device.

The present disclosure describes systems, devices, and methods for adjusting a target delay value (e.g., a delay parameter value) of a de-jitter buffer. Because audio packets may be received via a packet-switched network with varying delays (e.g., jitters) with respect to an order in which the audio packets were transmitted, the de-jitter buffer may be used to store and reorder the received audio packets to enable play out (e.g., generation of audio outputs based on the audio packets) of the audio packets in the correct order. To illustrate, a target delay value represents an amount of time before playout (e.g., generation of an audio output and removal from the de-jitter buffer) of a first audio packet of a talk spurt from the de-jitter buffer. In some implementations, the target delay value of the de-jitter buffer is set as a default value. After playout of the first audio packet, audio packets are played out at a particular rate, such as playout every 20 milliseconds (ms). If there is no audio packet in the de-jitter buffer to play out at a particular time, an erasure condition (or other error condition) occurs. The target delay value is set based on competing considerations of reducing overflow (e.g., by having a higher target delay value) and reducing mouth-to-ear delay (e.g., by having a lower target delay value).

In order to determine a target delay value that more accurately reflects delay within a network at a particular time, the target delay value (i.e., a default target delay value) may be adjusted based on an estimated network delay (referred to herein as "arrival delay", "mean delay value" or "pseudo mean delay value"). The arrival delay value may be attributable to network conditions that impact an amount of delay from a time of transmission of a packet to a time of reception of the packet. The arrival delay (e.g., the estimated network delay) is used to adjust the target delay value because a device sending the audio packets and the device (that includes the de-jitter buffer) receiving the audio packets may not be synchronized (i.e., a clock of the send device is not synchronized with a clock of the receive device). In the case that the clocks of the send device and the receive device are not synchronized, a precise delay through the network is difficult to measure or calculate.

To determine the arrival delay, the receive device identifies a particular receive time of an audio frame received from the send device and designates the audio frame as a control frame (e.g., the particular receive time as a control time). The receive device determines an expected receive time for subsequently received packets based on the particular receive time of the control frame. For example, in some applications the receive device expects to receive packets periodically at a particular rate (e.g., every 20 ms), which corresponds to a transmission rate of the send device, a playout rate of the receive device, or both. In some implementations, the receive device may designate a subsequent audio frame as a new control frame to correct for clock drift of a clock of the receive device. For example, the receive device may select a new control frame periodically, randomly, or responsive to a condition, such as at a time that an amount of clock drift is greater than or equal to a threshold.

After the audio frame is received and designated as the control frame, the receive device receives additional audio frames. For each audio frame, the receive device identifies a corresponding receive time of the audio packet and determines a reference delay value of the audio frame based on the receive time of the audio packet and an expected receive time of the audio packet. To illustrate, the reference time of a particular packet may be determined as a difference between the expected receive time of the particular audio packet and the (actual) receive time of the particular packet by the receive device. Reference delay values associated with the audio packets may have a Gaussian distribution, and the arrival delay value may be a mean or center value of the Gaussian distribution.

The arrival delay value may be determined based on one or more reference delay values. For example, the receive device may be configured to use a sliding window of previously received audio packets (e.g., 50 most recently received packets) to determine the arrival delay value. To illustrate, the arrival delay value may be calculated as an average value of the reference delay values of the 50 most recently received packets. Alternatively, a sliding window may be used, such as a sliding window covering the past 200 ms, as an illustrative, non-limiting example. To illustrate, the arrival delay value may be calculated as an average value of the reference delay values of the packets received during the past 200 ms.

The receive device may adjust the target delay value based on a comparison of the arrival delay and a reference delay value associated with a first audio packet (e.g., an initial frame) of a talk spurt. For example, the receive device may determine an offset value that corresponds to a deviation between the arrival delay value and the reference delay value. The reference delay value of the first audio packet is determined based on an expected receive time of the first audio packet and a receive time (e.g., an actual receive time) of the first audio packet.

The receive device may adjust the target delay value (of the de-jitter buffer) based on the offset value to generate an adjusted target delay value that is applied to the first audio packet. As an example, the receive device may increase the target delay value by the offset value if the arrival delay value is greater than the reference delay value. As another example, the receive device may decrease the target delay value by the offset value if the arrival delay value is less than the reference delay value. As another example, the receive device may maintain the target delay value if there is no difference between the arrival delay value and the reference delay value. In another implementation, the receive device decreases the target delay value if the arrival delay value is less than the reference delay, and maintains the target delay value if the arrival delay value is greater than or equal to the reference delay.

In some implementations, if the reference delay value of the first packet of a talk spurt is greater than the arrival delay value by a threshold value, the device may drop the initial packet. For example, the receive device may not playout the initial packet and may playout a next sequential packet of the talk spurt. To playout the next sequential packet of the talk spurt, the receive device may immediately playout the next sequential packet, may playout the next sequential packet after a target delay, or may determine whether to adjust (increase, decrease, or maintain) the target delay based on the next sequential packet.

In some implementations, the arrival delay may be selectively used to adjust the target delay value. For example, the arrival delay value may be used in response to a determination that the arrival delay has converged within a threshold (e.g., a threshold range) of a set of previous arrival delay values. Stated differently, the value of the arrival delay should not vary greatly or drastically fluctuate over a given time period. If the arrival value is determined to have converged, the arrival delay may be used to determine whether to adjust the target delay. In the event that the arrival delay does not converge (e.g., the value of the arrival delay is erratic, random, or varies over time by more than a threshold amount), the receive device may not adjust the target delay based on the arrival delay. Accordingly, when the arrival delay is not stable or not useful, the arrival delay is not utilized and the risk of underflows is no better off (or worse off) than just applying the target delay to the initial audio packet of a talk spurt.

Although the arrival delay value does not measure actual network delay (e.g., the device that includes the de-jitter buffer is not synchronized with the device sending the audio packets, and thus the calculated value does not measure the exact delay through the network), the arrival delay value is sufficient because the adjustment of the target delay relies on a difference between the arrival delay value and the reference delay value of the first packet of a talk spurt and any arrival delay measurement skew due to the absence of clock synchronization will be canceled out in the calculation. Adjusting the target delay value of the de-jitter buffer, as described herein, improves output speech quality, reduces a mouth-to-ear delay (e.g., end-to-end delay), or achieves a better balance between output speech quality (impacted or degraded by underflow associated with the de-jitter buffer) and mouth-to-ear delay. For example, increasing the target delay value at particular times (e.g., when the arrival delay value is greater than the reference delay value) may reduce underflow conditions, which may improve audio output quality, and reducing the target delay value at other times (e.g., when the arrival delay value is less than the reference delay value) may reduce mouth-to-ear delay, which improves user experience.

Referring to FIG. 1, a particular illustrative aspect of a system that adjusts an operating parameter of a de-jitter buffer is shown and generally designated 100. The system 100 includes a first device 102, a network 112, and a second device 120. Although two devices are illustrated as being included in the system 100, in other implementations the system 100 may include more than two devices. The first device 102 and the second device 120 may include communication devices, a base station, headsets, decoders, smart phones, cellular phones, mobile communication devices, laptop computers, computers, tablets, personal digital assistants (PDAs), set top boxes, video players, entertainment units, display devices, televisions, gaming consoles, music players, radios, digital video players, digital video disc (DVD) players, tuners, cameras, navigation devices, vehicles, on-board components of vehicles, or combinations thereof, as illustrative, non-limiting examples.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

The first device 102 may include a microphone 104, analog front end circuitry 106, an encoder 108, and a modem 110. The microphone 104 may be configured to receive an audio input, such as speech from a person talking, and to generate an input audio signal. The analog front end circuitry 106 is configured to process the input audio signal to generate a sequence of audio frames, such as performing filtering or other operations on the input audio signal. Each audio frame may include samples of an analog audio signal. The analog front end circuitry 106 may include hardware, software, or a combination thereof. The sequence of audio frames may correspond to audio of a communication session, such as a voice call, as a particular example. The encoder 108 is configured to encode a sequence of audio frames to generate a sequence of audio packets. Each of the audio packets may include at least a portion of one or more audio frames. In some implementations, the audio frames are encoded as high-band parameters and an encoded low-band signal. In a particular implementation, each of the audio packets (or the audio frames) has a fixed size, and an amount of bandwidth (e.g., number of bits of an audio frame) allocated to the encoded low-band signal and to the high-band parameters can be dynamically adjusted from audio frame to audio frame.

The modem 110 may be configured to encapsulate the audio packets in data packets, such as real-time transport protocol (RTP) packets, and to initiate transmission of the data packets containing the audio packets, such as via a transmitter or a transceiver of the first device 102. Each of the data packets (e.g., each RTP packet) may contains a sequence number (or a timestamp) corresponding the relative time instance of the first speech frame in the data packet at the source device. In some implementations, when a data packet includes a timestamp, the timestamp may be determined based on a common clock (e.g., a clock used by the first device 102 and the second device 120) or corresponding local clocks, as further described herein. The sequence number, the timestamp, or both are used by a de-jitter buffer in a receiving device. For example, the sequence number or the time stamp may be used to arrange received packets in the de-jitter buffer. Although the RTP packetization is described as being performed by the modem 110, in other implementations, the first device 102 may include an ADSP processor or other dedicated circuitry configured to encapsulate the audio packets in the RTP packets. Additionally, the first device 102 may include a processor and a memory (not shown), the memory storing instructions that, when executed by the processor, cause the processor to perform one or more of the operations described herein.

Additionally, the first device 102 may transmit one or more silence indicator (SID) frames (e.g., silence packets) between talk spurts. A SID frame may be a NULL frame or may include information other than audio data. The second device 120 may identify a beginning of a talk spurt based on receiving an audio packet following reception of a particular number of SID frames. As a non-limiting example, if ten or more SID frames are received consecutively, the next audio packet may be identified as a first audio packet of a next talk spurt. Alternatively, the first device 102 does not transmit SID frames and a audio frame of a talk spurt may indicate a number of silence frames between a last audio frame of and the audio frame.

The first device 102 may be configured to generate a plurality of audio packets 114 and to transmit the plurality of audio packets 114 (encapsulated in a plurality of data packets) via the network 112. The plurality of audio packets 114 may be sent individually or as groups of audio packets. The plurality of audio packets 114 may be associated with a first order. For example, each audio packet may include or correspond to a timestamp, and the first order may correspond to a temporal order of the plurality of audio packets 114 as indicated by the timestamps. Although timestamps are described herein, any type of timing information or ordering information may be used to indicate an order of audio packets.

The network 112 may include a packet-switched network. For example, the network 112 may include a voice over internet protocol (VoIP) network, a voice over long term evolution (VoLTE) network, or another packet-switched network. The network 112 may include one or more devices, such as one or more media gateways, that are configured to receive the audio packets and to transmit the audio packets through the network 112 to the second device 120. Additionally, the one or more devices may be configured to receive the SID frames and to transmit the SID frames through the network 112 to the second device 120.

Consecutive packets (e.g., audio packets, SID frames, or both) transmitted separately through the network 112 may incur different network delays (e.g., delays travelling through the network), also referred to as jitter. For example, a first audio packet may travel through the network 112 via a first path that is longer than a second path through the network 112 travelled by a second audio packet. Accordingly, the second audio packet may arrive at the second device 120 before the first audio packet, even though the first audio packet is transmitted prior to the second audio packet. Thus, the plurality of audio packets 114 (having a first order) may be transmitted by the first device 102 and may be received as a plurality of audio packets 116 (having a second order) at the second device 120. As another example, the first audio packet and the second audio packet that are transmitted 20 ms apart by the first device 102 may be received by the second device 120 more than 20 ms apart, 20 ms apart, or more than 20 ms apart as a result of a first delay of the first packet through the network 112, a second delay of the second packet through the network 112, or both the first delay and the second delay.

In some implementations, the plurality of audio packets 116 includes fewer audio packets than the plurality of audio packets 114 due to one or more audio packets being lost (e.g., dropped or failed to be received by the second device 120 due to one or more network conditions or faults). The plurality of audio packets 116 may be associated with a second order that is different from the first order associated with the plurality of audio packets 114. For example, one or more audio packets of the plurality of audio packets 114 may have varying delays associated with arrival at the second device 120, causing the second order associated with the plurality of audio packets 116 to differ from the first order associated with the plurality of audio packets 114.

The second device 120 may include a receiver 122, a de-jitter buffer 150, de-jitter buffer control circuitry 130, a decoder 124, a processor 126, a speaker 128 (e.g., an output device), and a memory 140. The receiver 122 may be configured to receive a plurality of packets (e.g., audio packets, SID frames, or a combination thereof) from the first device 102 (e.g., a source device) via the network 112. For example, the receiver 122 may be configured to receive a plurality of audio packets 116 from the first device 102 (e.g., a source device) via the network 112. The plurality of audio packets 116 may be encapsulated within a plurality of data packets, and a modem (not illustrated) may be configured to extract the plurality of audio packets 116 from the plurality of data packets. The plurality of audio packets 116 (or audio frames decoded from the plurality of audio packets 116) may be stored in the de-jitter buffer 150. The decoder 124 may be configured to receive audio packets that are dequeued from the de-jitter buffer 150 and to decode the audio packets to generate audio frames (e.g., a decoded audio signal).

The memory 140 includes (e.g., stores) data, such as an arrival delay value 142, a reference delay value 144, a threshold 146, an offset value 148, and historical delay values 149, as described further herein. In some implementations, the memory 140 may also include a target delay value 132, such as a default target delay value. The memory 140 may include code (e.g., interpreted or complied program instructions) that may be executed by the de-jitter buffer control circuitry 130, the processor 126, or a combination thereof, to cause the de-jitter buffer control circuitry 130, the processor 126, or a combination thereof, to perform functions as described herein. The processor 126 may be configured to generate an audio signal based on a decoded audio signal (e.g., based on one or more decoded audio frames based on one or more of the audio packets stored at the de-jitter buffer 150). The speaker 128 may be configured to play out (e.g., configured to output) an audio output based on the audio signal.

The de-jitter buffer 150 may be configured to store the plurality of audio packets 116 received from the first device 102. For example, the de-jitter buffer 150 may store a first audio packet 152, a second audio packet 154, a third audio packet 156, and an Nth audio packet 158, where N is a positive integer. Although four audio packets are illustrated, in other implementations, the de-jitter buffer 150 may store more than four or fewer than four audio packets. Because audio packets transmitted via the network 112 can arrive with varying delays (e.g., jitter), the de-jitter buffer 150 may be used to store and reorder (e.g., by the processor 126, the de-jitter buffer control circuitry 130, or a de-jitter buffer manager) the received audio packets based on identifiers in the audio packets, such as timestamps or sequence numbers. For example, the first audio packet 152 may include or correspond to a first timestamp 160, the second audio packet 154 may include or correspond to a second timestamp 162, the third audio packet 156 may include or correspond to a third timestamp 164, and the Nth audio packet 158 may include or correspond to an Nth timestamp 166, where N is a positive integer.

Talk spurts may be identified based on silences between the talk spurts. To illustrate, if a particular amount of time expires before receipt of a next audio packet, the next audio packet may be identified as a first audio packet (e.g., an initial audio packet) of a next talk spurt. For example, if the amount of time between receipt of a previous audio packet and receipt of the current audio packet exceeds 200 ms, the current audio packet may be identified as a first audio packet of a talk spurt.

The de-jitter buffer 150 may be configured to dequeue audio packets of a talk spurt after a "target delay" (e.g., based on the target delay value 132). To illustrate, after receiving a first audio packet (e.g., an initial audio packet) of a talk spurt, the de-jitter buffer control circuitry 130 may cause the de-jitter buffer 150 to play out (e.g., dequeue) the first audio packet after a particular amount of time represented by the target delay value 132. After playout of the first audio packet of the talk spurt, additional audio packets may be played out at a particular rate. As a non-limiting example, if the target delay value 132 is 100 ms, and the particular rate is 20 ms, a first audio packet of a talk spurt is played out 100 ms after receipt of the first audio packet, a second audio packet of the talk spurt is played out 20 ms after play out of the first audio packet, etc. The second packet may be sequentially next packet of the talk spurt after the first audio packet. The target delay value 132 may initially be set based on an application being executed at the second device 120, a wireless communication mode (e.g., VoLTE, VoIP, etc.), or other factors. In some implementations, the target delay value 132 is set to a default value stored at the memory 140.

The de-jitter buffer control circuitry 130 (or the processor 126) may be configured to adjust a target delay of the de-jitter buffer 150 (e.g., to adjust the target delay value 132). The de-jitter buffer control circuitry 130 may adjust the target delay value 132 responsive to identification of a first audio packet (e.g., an initial audio packet) of a talk spurt. For example, the de-jitter buffer control circuitry 130 may adjust the target delay value 132 based a receive time of the first audio packet and based on an arrival delay value 142 (also referred to herein as a "mean delay value" or "pseudo mean delay value"). The arrival delay value 142 represents an estimated network delay (e.g., an estimated average network delay) corresponding to audio packet transmissions from the first device 102 to the second device 120 via the network 112.

The de-jitter buffer control circuitry 130 is configured to determine (e.g., calculate or estimate) an arrival delay value 142. In a particular implementation, the arrival delay value 142 may be determined based on delay values (e.g., reference delay values) associated with previously received audio packets. The de-jitter buffer control circuitry 130 may determine the arrival delay value 142 as described with reference to an illustrative example 170 of a timeline of audio packets p0-p5 received at the second device 120 from the first device 102 via the network 112.

Referring to the example 170, the de-jitter buffer control circuitry 130 identifies a receive time t0 of an audio packet p0 (e.g., an audio frame) and designates the audio frame p0 as a control frame (e.g., designates the receive time t0 as a control time). The de-jitter buffer control circuitry 130 determines an expected receive time for subsequently received audio packets (e.g., packets p1-p5) based on the receive time t0 of the control frame (i.e., the audio packet p0). For example, the de-jitter buffer control circuitry 130 may determine to expect to receive audio packets p1-p5 periodically at a particular rate (e.g., every 20 ms), which corresponds to a transmission rate of the first device 102, a playout rate of the second device 120, or both. To illustrate, the de-jitter buffer control circuitry 130 identifies an expected receive time t1 for packet p1, an expected receive time t2 for packet p2, an expected receive time t3 for packet p3, an expected receive time t4 for packet p4, and an expected receive time t5 for packet p5. As illustrated in the example 170, packets p0-p4 corresponds to a first talk spurt and packet p5 corresponds to a second talk spurt.

For each of the audio packets p1-p5 received by the second device 120, the de-jitter buffer control circuitry 130 identifies a corresponding receive time of the audio packet. Additionally, for each of the audio packets p1-p5, the de-jitter buffer control circuitry 130 determines a corresponding reference delay value (e.g., the reference delay value 144) based on the receive time of the audio packet and an expected receive time of the audio packet. As an illustrative, non-limiting example, the reference delay value of a particular packet may be determined as a difference between the expected receive time of the particular audio packet and the (actual) receive time of the particular packet.

To illustrate, the de-jitter buffer control circuitry 130 may determine a reference delay value d1 for the packet p1 based on the receive time (e.g., the actual receive time) of the packet p1 and the expected receive time t1 for the packet p1. The de-jitter buffer control circuitry 130 may determine a reference delay value d2 for the packet p2 based on the receive time of the packet p2 and the expected receive time t2 for the packet p2. The de-jitter buffer control circuitry 130 may determine a reference delay value d3 for the packet p3 based on the receive time of the packet p3 and the expected receive time t3 for the packet p3. The de-jitter buffer control circuitry 130 may determine a reference delay value d4 for the packet p4 based on the receive time of the packet p4 and the expected receive time t4 for the packet p4. The de-jitter buffer control circuitry 130 may determine a reference delay value d4 for the packet p4 based on the receive time of the packet p4 and the expected receive time t4 for the packet p4. The de-jitter buffer control circuitry 130 may determine a reference delay value d5 for the packet p5 based on the receive time of the packet p5 and the expected receive time t5 for the packet p5. In some implementations, the reference delay values d1-d5 associated with the audio packets p1-p5 may be associated with a Gaussian distribution. In other implementations, the reference delay values d1-d5 may have a normal distribution or another type of distribution.

The de-jitter buffer control circuitry 130 may determine the arrival delay value 142 based on one or more of the reference delay values d1-d5. For example, the de-jitter buffer control circuitry 130 may be configured to use a sliding window of previously received audio packets (e.g., 50 most recently received packets) to determine the arrival delay value 142. To illustrate, the arrival delay value 142 may be calculated as an average value of the reference delay values of the 50 most recently received packets. In other implementations where the reference delay values d1-d5 may have a normal distribution or another type of distribution, the arrival delay value 142 may be associated with a different value (e.g., a mean, a mode, a most frequent reference delay value, etc.) with respect to the distribution of reference delay values d1-d5. Alternatively, a sliding window may be used, such as a sliding window covering the past 200 ms, as an illustrative, non-limiting example. To illustrate, the arrival delay value 142 may be calculated as an average value of the reference delay values of the packets received during the past 200 ms. The memory 140 may store historical delay values 149 that include the reference delay values d1-d5 for a particular number of previously received packets (or packets received over a particular amount of time). The historical delay values 149 may be updated by the de-jitter buffer control circuitry 130 (or the processor 126) during a communication session (a phone call) such that the historical delay values 149 include reference delay times for the particular number of most recently received packets or most recently played out packets.

As an illustrative example, the de-jitter buffer control circuitry 130 determines the arrival delay 142 as an average of the reference delay values d1-d4 for the audio packets p1-p4. Referring to the graph 180, a representation of a distribution (e.g., a Gaussian distribution) of the reference delay values p1-p4 is shown, where the arrival delay value 142 (labeled X) is the average of the reference delay values d1-d4 for the audio packets p1-p4. It is noted that a reference delay value 144 (e.g., reference delay d5) of the packet p5 is also included in the graph 180 for purposes of illustration as further described herein.

The de-jitter buffer control circuitry 130 may identify the packet p5 as a first (e.g., initial) packet of a second talk spurt and adjust the target delay value 132 based on receipt of the audio packet p5. For example, the de-jitter buffer control circuitry 130 may be configured to adjust the target delay value 132 associated with the de-jitter buffer 150 based on a comparison of the reference delay d5 (e.g., a reference delay value 144) of the audio packet p5 and the arrival delay value 142. To illustrate, the de-jitter buffer control circuitry 130 may be configured to determine an offset value 148 based on the reference delay d5 (e.g., a reference delay value 144) and the arrival delay value 142 (e.g., by subtracting the reference delay d5 from the arrival delay value 142). The offset value 148 may include a numerical value and a sign value (e.g., positive or negative). The offset value 148 may also be referred to as a deviation value or a distance value (with respect to the arrival delay value 142). In some implementations, the de-jitter buffer control circuitry 130 may determine the arrival delay value 142 based on the reference delay value 144 (e.g., the reference delay d5 for the packet p5) and may determine the offset value 148 based on a difference between the reference delay value 144 (e.g., the reference delay d5 for the packet p5) and the arrival delay value 142 determined based on the reference delay d5. To illustrate:

Offset Value 148=Arrival Delay Value 142–Reference Delay Value 144.

The de-jitter buffer control circuitry 130 may be configured to adjust the target delay value 132 based on the offset value 148. Adjusting the target delay value 132 may increase or decrease the amount of time between receipt of the first audio packet 152 and playout of the first audio packet 152. As a particular example, if the offset value 148 has a positive value, the de-jitter buffer control circuitry 130 may increase the target delay value 132 by the offset value 148 (or an additional delay equal to the offset value 148 may be imposed prior to the target delay), as further described with reference to FIGS. 3 and 4. As another particular example, if the offset value 148 has a negative value, the de-jitter buffer control circuitry 130 may decrease the target delay value 132 by the offset value 148, as further described with reference to FIG. 5. The de-jitter buffer control circuitry 130 may refrain from adjusting the target delay value 132 if the offset value 148 is equal to zero. In a particular implementation, the de-jitter buffer control circuitry 130 may be configured to adjust the target delay value 132 based on the offset value 148 if the offset value 148 satisfies (e.g., is greater than or equal to) a threshold 146 and to refrain from adjusting the target delay value 132 if the offset value 148 does not satisfy (e.g., is less than) the threshold 146.

In a particular implementation, the de-jitter buffer control circuitry 130 may be configured to perform "partial delay adjustment." In this implementation (i.e., "the partial delay adjustment implementation"), the de-jitter buffer control circuitry 130 may be configured to decrease the target delay value 132 if the offset value 148 has a negative value and to refrain from adjusting the target delay value 132 if the offset value 148 has a positive value or is equal to zero. Stated differently, the de-jitter buffer control circuitry 130 decreases the target delay value 132 if the arrival delay value 142 is less than the reference delay value 144, and maintains the target delay value 132 if the difference is greater than or equal to zero. Partial delay adjustment may represent a higher priority on reducing mouth-to-ear delay than on reducing underflow conditions.

In some implementations, if the first packet (e.g., an initial audio packet) of a talk spurt has much higher delay than the arrival delay value 143 plus the target delay value 132, by rendering this packet, the entire talk spurt may suffer from higher mouth-to-ear delay (e.g., end-to-end delay). In these implementations, the de-jitter buffer control circuitry 130 drops the initial audio packet (e.g., skips playout of the initial audio packet). For example, if the reference delay value of the first packet of a talk spurt is greater than the arrival delay value by a threshold 146, the de-jitter buffer control circuitry 130 may drop the initial packet. For example, the de-jitter buffer control circuitry 130 may not playout the initial packet and may playout a next sequential packet of the talk spurt. To playout the next sequential packet of the talk spurt, the de-jitter buffer control circuitry 130 may immediately playout the next sequential packet, may playout the next sequential packet after a target delay value 132, or may determine whether to adjust (increase, decrease, or maintain) the target delay value 132 (e.g., based on a reference delay of the next sequential packet as compared to the arrival delay value 142). As an illustrative, non-limiting example, if the initial audio packet of the talk-spurt is higher than the arrival delay value 142 and if the offset value 148 of the initial audio packet is higher than the target delay value 132 (e.g., 100 ms) but less than a 240 ms threshold, the de-jitter buffer control circuitry 130 drops the initial audio packet and plays out the next sequential audio packet, thus reducing the mouth-to-ear delay by 20 ms. Additionally, or alternatively, a number of packets that may be skipped (e.g., dropped) during a talk spurt may be limited to a threshold number.

During operation, the first device 102 may generate and transmit the plurality of audio packets 114 via the network 112. The second device 120 may receive the plurality of audio packets 116 via the network 112 (e.g., a packet-switched network). As described above, because each audio packet may travel a different path through the network 112, audio packets may be received with varying delay, one or more audio packets may be lost or otherwise not properly received at the second device 120, or a combination thereof. Thus, the plurality of audio packets 116 may include fewer audio packets than the plurality of audio packets 114, the plurality of audio packets 116 may be associated with a different order than the plurality of audio packets 114, and audio packets of the plurality of audio packets 116 may be received with varying delays (e.g., jitter).

The de-jitter buffer control circuitry 130 may determine a target delay value 132 and an arrival delay value 142 prior to detecting a beginning of a talk spurt. The de-jitter buffer control circuitry 130 may detect the beginning of the talk spurt by detecting, after a period of silence, an initial audio packet of the plurality of audio packets 116.

The de-jitter buffer control circuitry 130 may determine a reference delay value 144 for the initial audio packet of the talk spurt. Based on the reference delay value 144 of the initial audio packet, the de-jitter buffer control circuitry 130 may determine an offset value 148 between the arrival delay value 142 and the reference delay value 144 associated with the initial audio packet of a talk spurt.

The de-jitter buffer control circuitry 130 may adjust the target delay value 132 of the de-jitter buffer 150 based on the offset value 148. As an example, the de-jitter buffer control circuitry 130 may increase the target delay value 132 by the offset value 148 if the arrival delay value 142 is greater than the reference delay value 144. As another example, the de-jitter buffer control circuitry 130 may decrease the target delay value 132 by the offset value 148 if the arrival delay value 142 is less than the reference delay value 144. As another example, the de-jitter buffer control circuitry 130 may maintain the target delay value 132 if there is no difference between the arrival delay value 142 and the reference delay value 144. The de-jitter buffer control circuitry 130 may then playout the audio packet based on the determined adjusted or non-adjusted target delay applied to the audio packet. For example, the speaker 128 (e.g., a speaker device) may output an audio representation of the first audio packet after the first audio packet is buffered for the adjusted target delay value 132.

In some implementations, the de-jitter buffer control circuitry 130 may selectively use the arrival delay value 142 to adjust the target delay value 132 based on a determination that the arrival delay 142 has converged within a threshold (e.g., a threshold range) of a set of previous arrival delay values, such as a set of previous arrival delay values stored in the memory 140 as part of the historical delay values 149. Stated differently, the value of the arrival delay value 142 should not vary greatly or drastically fluctuate over a given time period. If the arrival delay value 142 is determined to have converged, the arrival delay value 142 may be used to determine whether to adjust the target delay 132 as described herein. In the event that the arrival delay value 142 does not converge (e.g., the arrival delay value 142 is erratic, random, or varies over time by more than a threshold amount), the de-jitter buffer control circuitry 130 may not adjust the target delay value 132 based on the arrival delay value. Accordingly, when the arrival delay value 142 is not stable or not useful, the arrival delay value 142 is not utilized and the risk of underflows is no better off (or worse off) than just applying the target delay value 132 to the initial audio packet of a talk spurt.

In some implementations, the de-jitter buffer control circuitry 130 may designate an audio frame as a new control frame to correct for clock drift of a clock of the receive device. For example, the de-jitter buffer control circuitry 130 may select a new control frame periodically, randomly, or responsive to a condition, such as an amount of clock drift being greater than or equal to a threshold.

Thus, the system 100 enables an adjustable de-jitter buffer that reduces mouth-to-ear delay as compared to other de-jitter buffers. For example, increasing the target delay value at particular times (e.g., when the arrival delay value 142 is greater than the reference delay value 144) may reduce underflow conditions, which may improve audio output quality, and reducing the target delay value 132 at other times (e.g., when the arrival delay value 142 is less than the reference delay value 144) may reduce mouth-to-ear delay, which improves user experience.

Figure 2:
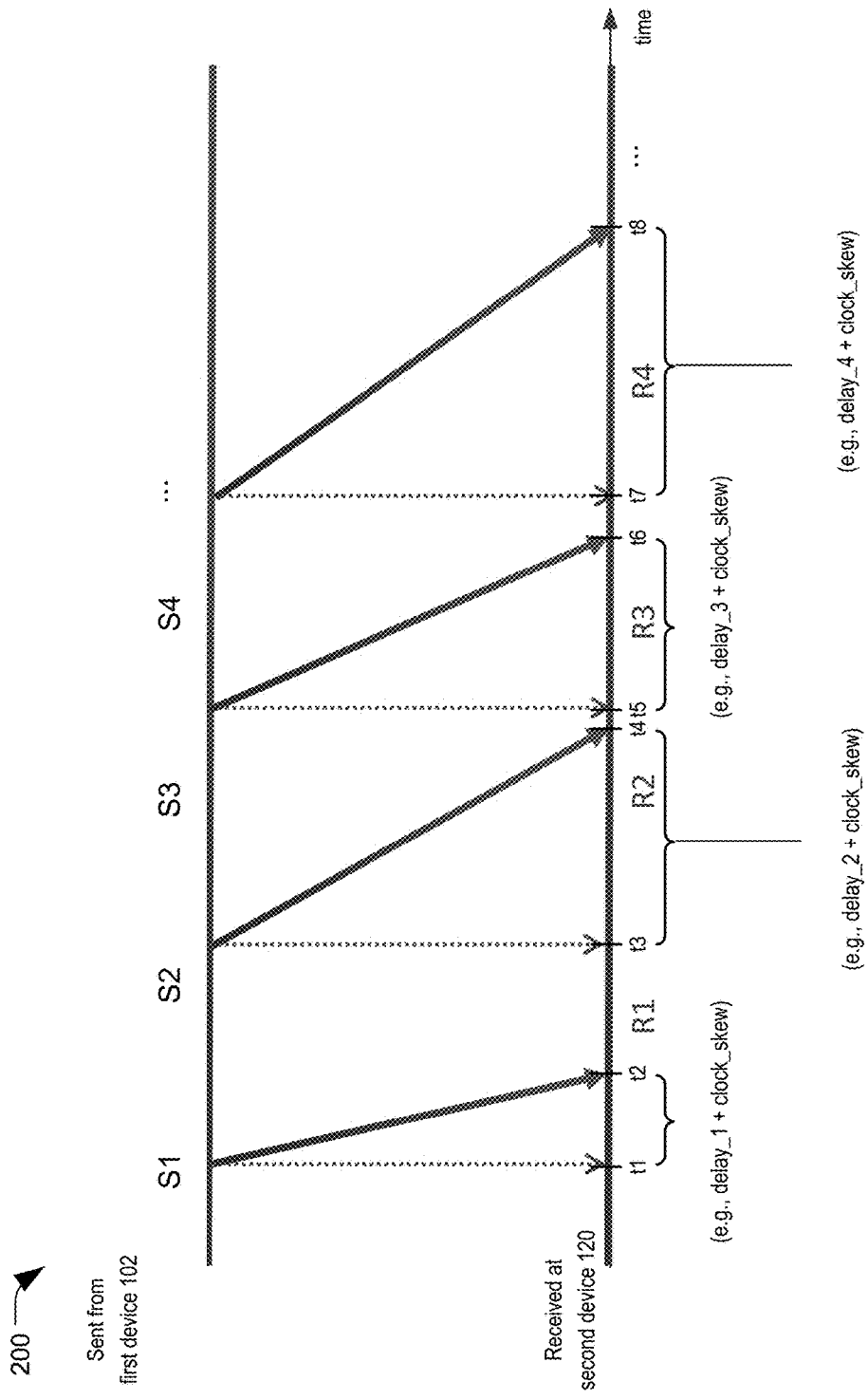
FIG. 2 illustrates an example of estimating an arrival value for audio packets received at a de-jitter buffer.

Referring to FIG. 2, a timing diagram 200 that depicts transmission times and receipt times of audio packets with respect to the first device 102 and the second device 120 is illustrated. The first device 102 may send audio packets every 20 ms to the second device 120. For example, the first device 102 may send a first audio packet at t1 (20 ms), a second audio packet at t3 (40 ms, which is 20 ms after t1), a third audio packet at t5 (60 ms, which is 20 ms after t3), and a fourth audio packet at t7 (80 ms, which is 20 ms after t5). The original send time for a packet (e.g., a RTP packet) is denoted by S. The second device 120 may predict to receive audio packets (in the absence of network delay) at a rate of once per 20 ms, such as at time t1 (20 ms), time t3 (40 ms), time t3 (60 ms), and time t4 (80 ms). The receive time for a packet (e.g., a RTP packet) is denoted by R. A clock skew is present between the sent time S and the receive time R since send times and receive times are based on different clocks, e.g., the send times are based on a clock of the first device 102 and the receive times are based on a clock of the second device 120. Due to clock skew at the second device 120 with respect to the first device 102, times measured at the first device 102 (e.g., sending times S1-S4 of the first-fourth audio packets) are not the same as times measured at the second device 120.

In a particular implementation, to determine the arrival delay value 142, a delay (denoted "delay" below) is determined for a particular packet. For example, a delay of the first audio packet may be determined and designated "delay_1". The delay for the particular packet may be determined based on a predicted sending time and an actual receipt time measured at the second device 120. To illustrate, the first audio packet is received at time t2, the second audio packet is received at time t4, the third audio packet is received at time t6, and the fourth audio packet is received at time t8. Delay values may be measured based on the differences between predicted sending times and actual arriving times, and the delay values may be compensated for clock skew in determining the arrival delay value 142.

The arrival delay value 142 (denoted ArrivalDelay) may be determined by the de-jitter buffer control circuitry 130 (or the processor 126) based on sent times of packets, receive times of the packets, delays of the packets, and clock skew. To illustrate, referring to the illustrative talk spurt depicted in FIG. 2, send times (denoted S) for the packets include: S1, S2, S3, etc.; receive times (denoted R) for the packets include: R1, R2, R3, etc.; the delays for the packets include: delay_1, delay_2, delay_3, etc.; and the clock skew is denoted "clock skew".

A first receive time R1 for a first packet is: R1=S1+ delay_1+clock_skew. A receive time R2 for a second packet is: R2=S1+(S2−S1)+delay_2+clock_skew=S2+delay_2+ clock_skew. A receive time R3 for a thrid packet is: R3=S1+ (S3−S1)+delay_3+clock_skew=S3+delay_3+clock_skew.

A difference between a particular packet's send time and receive time may correspond to a combination of a delay of the packet and the clock skew. To illustrate, for the first packet, R1−S1=delay_1+clock_skew; for the second packet, R2−S2=delay_1+clock_skew; and for the third packet R3−S3=delay_3+clock_skew.

Equation 1 (below) may be used to solve for the arrival delay value 142 of the packets, where numOfPackets represents the number of packets associated with the historical delay values 149 (e.g., a number of packets in a talk spurt) and "Sum" is a summing function.

$$\text{Sum}(R1-S1, R2-S2, R3-S3, R4-S4, \ldots) = \text{Sum}(\text{delay\_1}, \text{delay\_2}, \text{delay\_3}, \text{delay\_4}, \ldots) + \text{clock\_skew} * \text{numOfPackets} \quad \text{Equation 1}$$

Dividing both sides of Equation 1 by numOfPackets results produces Equation 2 in which an average delay of the packets is equal to the sum of the delays divided by numOfPackets and is denoted Mean(Delays).

$$\text{Sum}(R1-S1, R2-S2, R3-S3, R4-S4, \ldots)/\text{numOfPackets} = \text{Mean}(\text{Delays}) + \text{clock\_skew} \quad \text{Equation 2}$$

The arrival delay value 142 for the plurality of packets may be determined as an average of the differences of the receive times and the send times of the packets. Accordingly, Equation 2 may be re-written as Equation 3 in terms of the arrival delay value 142 (denoted ArrivalDelay).

$$\text{ArrivalDelay} = \text{Mean}(\text{Delays}) + \text{clock\_skew} \quad \text{Equation 3}$$

In some implementations, the arrival delay value 142 may be calculated after each talk spurt. In other implementations, the arrival delay value 142 may be determined throughout a communication session (e.g., a call).

After the ArrivalDelay is determined, the de-jitter buffer controller circuitry 130 may detect the beginning of a next talk spurt based on reception of an initial audio packet of the next talk spurt. The de-jitter buffer controller circuitry 130 calculate the offset value 148 (denoted Offset, which can be a positive value, a negative value, or zero) based on the ArrivalDelay as described below. To illustrate, the initial audio packet of the next talk spurt may correspond to a send time denoted "NewS1", a receive time denoted "NewR1", and a delay denoted "NewDelay".

Equation 4 (below) describes the relationship between the send time NewS1, the receive time NewR1, and the delay NewDelay of the initial packet of the next talk spurt.

$$\text{NewR1} - \text{NewS1} = \text{NewDelay} + \text{clock\_skew} \quad \text{Equation 4}$$

Based on the delay NewDelay, the offset (Offset) associated with the initial audio packet of the next talk spurt with respect the ArrivalDelay may be determined as follows:

$$\text{Offset} = \text{Mean}(\text{Delays}) - \text{NewDelay}$$

$$= \text{ArrivalDelay} - \text{clock\_skew} - (\text{NewR1} - \text{NewS1}) + \text{clock\_skew}$$

$$= \frac{\text{Sum}(R1 - S1, R2 - S2, R3 - S3, \ldots)}{\text{numOfPackets}} - (\text{NewR1} - \text{NewS1})$$

The target delay value 132 (denoted "BufferTargetDelay") may be adjusted based on the offset value 148 (denoted "Offset") to determine an adjusted delay value (denoted AdjustedTargetDelay) to be applied to the initial audio packet of the next talk spurt. To illustrate:

$$\text{AdjustedTargetDelay} = \text{Offset} + \text{BufferTargetDelay}$$

The de-jitter buffer control circuitry 130 may apply the AdjustedTargetDelay to the initial audio packet of the next talk spurt. Adjusting the target delay value 132 may improve the audio output quality by reducing underflow conditions as compared to using a fixed value for the target delay value 132. To illustrate, the average mouth-to-ear delay (denoted "avg. m2ear delay") may be determined based on Equation 5, $$\text{avg. m2ear delay} = \frac{\left(\sum_{i=0}^{j-1}(M+D) + \sum_{i=j}^{n-1} Ki\right)}{n} > \quad \text{Equation 5}$$

$$\frac{\left(\sum_{i=0}^{j-1}(M+D) + \sum_{i=j}^{n-1}(M+D)\right)}{n} > \frac{\left(\sum_{i=0}^{n-1}(M+D)\right)}{n} > M+D$$

where M is the arrival delay value 142, D is a fixed value of the target delay value 132, Ki represents the delay due for each i th audio packet, n represents the total number of audio packets, and j represents the number of audio packets that have delay less than or equal to M+D, where each of i, n, and j is a positive integer. Based on Equation 5, the average mouth-to-ear delay (e.g., end-to-end delay) due to adjusting the target delay value 132 is slightly greater than M+D, thereby increasing the average mouth-to-ear delay for the second device 120. Additionally, the average mouth-to-ear delay (denoted "avg. m2ear delay") of Equation 5 provides a slight increase to the mouth-to-ear delay (e.g., end-2-end delay) as compared to the legacy de-jitter buffer behavior in which the average mouth-to-ear delay of the legacy de-jitter buffer (e.g., end-to-end delay of legacy de-jitter buffer) may be determined as:

$$\text{avg. m2ear delay of legacy de-jittering} = \frac{\left(\sum_{i=0}^{n-1}(Ki+D)\right)}{n} \quad \text{Equation 6}$$

$$= \frac{\sum_{i=0}^{n-1} Ki}{n} + D$$

$$= M + D.$$

The term "slight" is used when comparing the average mouth-to-ear delay (denoted "avg. m2ear delay") of Equation 5 to the mouth-to-ear delay (e.g., end-2-end delay) as compared to the legacy de-jitter buffer (denoted "avg. m2ear delay of legacy de-jittering" of Equation 6) because the probability for packets with delay a higher than M+D should be relatively low.

In implementations where the de-jitter buffer control circuitry 130 may perform the partial delay adjustment implementation (as described above with reference to FIG. 1), adjusting the target delay value 132 according to the partial delay adjustment implementation may improve the average mouth-to-ear delay as compared to using a fixed value for the target delay value 132. To illustrate, the average mouth-to-ear delay (e.g., an end-to-end delay) in the partial delay adjustment implementation (denoted "avg. m2ear partial delay adjustment") may be determined based on Equation 7, $$\text{avg. m2ear partial delay adjustment} = \quad \text{Equation 7}$$

$$\frac{\left(\sum_{i=0}^{p-1}(Ki+D) + \sum_{i=p}^{j-1}(M+D) + \sum_{i=j}^{n-1}Ki\right)}{n} <$$

$$\frac{\left(\sum_{i=0}^{j-1}(M+D) + \sum_{i=j}^{n-1}Ki\right)}{n} < \text{the average mouth-to-ear delay}$$

(denoted (d "avg. m2ear delay" of Equation 5)

where M is the arrival delay value 142, D is a fixed value of the target delay value 132, Ki represents the delay due for each i th audio packet, n represents the total number of audio packets, p represents the number of packets with delay less than or equal to the arrival delay value 142, and j represents the number of audio packets that have delay less than or equal to M+D, where each of i, n, and j is a positive integer. The average mouth-to-ear delay (e.g., an end-to-end delay) in the partial delay adjustment implementation (denoted "avg. m2ear partial delay adjustment" in Equation 7) reduces the mouth-to-ear delay (e.g., end-to-end delay) to be lower than the average mouth-to-ear delay (denoted "avg. m2ear delay" of Equation 5).

Additionally, the average mouth-to-ear delay (e.g., an end-to-end delay) in the partial delay adjustment implementation (denoted "avg. m2ear partial delay adjustment") may also be written as:

$$\text{avg. m2ear partial delay adjustment} = \quad \text{Equation 8}$$

$$\frac{\left(\sum_{i=0}^{p-1}(Ki+D) + \sum_{i=p}^{j-1}(M+D) + \sum_{i=j}^{n-1}Ki\right)}{n} <$$

$$\frac{\left(\sum_{i=0}^{j-1}(M+D) + \sum_{i=j}^{n-1}Ki\right)}{n} <$$

$$\frac{\left(\left(\sum_{i=0}^{p-1}(Ki) + \sum_{i=p}^{j-1}(Ki) + \sum_{i=j}^{n-1}(Ki)\right) + D*p + D*(j-p)\right)}{n} <$$

$$\frac{(M*n+D*j)}{n} < M+D < \text{the average mouth-}$$

to-ear delay of the legacy de-jitter buffer (denoted "avg. m2ear delay of legacy de-jittering"

of Equation 6)

where M is the arrival delay value 142, D is a fixed value of the target delay value 132, Ki represents the delay due for each i th audio packet, n represents the total number of audio packets, p represents the number of packets with delay less than or equal to the arrival delay value 142, and j represents the number of audio packets that have delay less than or equal to M+D, where each of i, n, and j is a positive integer.

The average mouth-to-ear delay (e.g., an end-to-end delay) in the partial delay adjustment implementation (denoted "avg. m2ear partial delay adjustment" in Equation 7 and Equation 8) reduces the mouth-to-ear delay (e.g., end-to-end delay) to be lower than the average mouth-to-ear delay of the legacy de-jitter buffer (denoted "avg. m2ear delay of legacy de-jittering" of Equation 6).

As an example of calculating the arrival delay value 142 and determining whether the arrival delay value 142 is useable, the de-jitter buffer control circuitry 130 (or the processor 126) may maintain the running average of DELAY_WINDOW_SIZE number of audio packets and identify the mean delay (denoted "window_avg"). The de-jitter buffer control circuitry 130 (or the processor 126) can calculate the average of the next CONVERGE_WINDOW_SIZE number of audio packets and identify a mean delay (denoted "new_avg") of the next CONVERGE_WINDOW_SIZE number of audio packets. If the absolute difference between new_avg and window_avg is within a convergence threshold (denoted "CONVERGE_THRESHOLD"), the mean delay is determined to be converged (denoted "running_avg"). If the new_avg differs from the window_avg by more than CONVERGE_THRESHOLD, the de-jitter buffer control circuitry 130 (or the processor 126) temporarily disables use of the arrival delay value 142 to determine whether to adjust the target delay and the de-jitter buffer control circuitry 130 (or the processor 126) repeats the process to identify an acceptable (e.g., converged) value for the arrival delay value 142. Additionally or alternatively, if an initial packet of a talk spurt deviates from the converged mean (denoted "running_avg") by more than MEAN_DELAY_RESET_THRESHOLD, the de-jitter buffer control circuitry 130 (or the processor 126) temporarily disables use of the arrival delay 142 to determine whether to adjust the target delay and the de-jitter buffer control circuitry 130 (or the processor 126) repeats the process to identify an acceptable (e.g., converged) value for the arrival delay 142. In some implementations, if the initial packet of a talk spurt deviates from the converged mean (denoted "running_avg") by more than MEAN_DELAY_RESET_THRESHOLD, the de-jitter buffer control circuitry 130 (or the processor 126) may drop (e.g., not playout) the initial packet of the talk spurt and may playout a next sequential audio packet of the talk spurt.

The memory 140 of the second device 120 may include code (e.g., interpreted or complied program instructions) that may be executed by the de-jitter buffer control circuitry 130, the processor 126, or a combination thereof, to cause the de-jitter buffer control circuitry 130, the processor 126, or a combination thereof, to perform functions as described herein. To further illustrate, Example 1 depicts illustrative pseudo-code (e.g., simplified C-code in floating point) that may be compiled and stored in the memory 140. The pseudo-code illustrates a possible implementation of aspects described herein. The pseudo-code includes comments which are not part of the executable code. In the pseudo-code, a beginning of a comment is indicated by a forward slash and asterisk (e.g., "/*") and an end of the comment is indicated by an asterisk and a forward slash (e.g., "*/"). To illustrate, a comment "COMMENT" may appear in the pseudo-code as /* COMMENT */.

In the provided example, the "==" operator indicates an equality comparison, such that "A==B" has a value of TRUE when the value of A is equal to the value of B and has a value of FALSE otherwise. The "&&" operator indicates a logical AND operation. The "H" operator indicates a logical OR operation. The ">" (greater than) operator represents "greater than", the ">=" operator represents "greater than or equal to", and the "<" operator indicates "less than". The term "f" following a number indicates a floating point (e.g., decimal) number format.

In the provided example, "*" may represent a multiplication operation, "+" or "sum" may represent an addition operation, "aba" may represent an absolute value operation, "avg" may represent an average operation, "++" may indicate an increment, "−" may indicate a subtraction operation, and "/" may represent a division operation. The "=" operator represents an assignment (e.g., "a=1" assigns the value of 1 to the variable "a"). Other implementations may include one or more conditions in addition to or in place of the set of conditions of Example 1.

Example 1

```
converged = false
running_avg = 0
new_mean = false
counter = 0
init = true
DELAY_WINDOW_SIZE = 400 /*(i.e., number of speech packets)*/
CONVERGE_WINDOW_SIZE = 100 /*(i.e., number of speech packets) */
CONVERGE_THRESHOLD = 10ms
MEAN_DELAY_RESET_THRESHOLD = MAX_QDJ_DELAY * 2
while (speech_packet)
{
    if (converged || init)
    {
        window_avg = avg(previous DELAY_WINDOW_SIZE speech packets)
        if ((abs(window_avg - running_avg) > CONVERGE_THRESHOLD) || init)
        {
            new_mean = true
            converged = false
            counter = 0
            init = false
        }
        else
        {
            running_avg = avg(running_avg, speech packet)
        }
    }
    if (new_mean == true)
    {
        counter++
        if (counter >= CONVERAGE_WINDOW_SIZE)
        {
            new_avg = avg(window_avg, previous
                        CONVERAGE_WINDOW_SIZE speech packets)
            if (abs(new_avg - window_avg) < CONVERGE_THRESHOLD)
            {
                converged = true
                running_avg = new_avg
            }
            new_mean = false
        }
    }
    if (converged)
    {
        if(isFirstPktOfTalkSpurt(speech_packet))
        {
            if(abs(speech_packet->pkt_dev - running_avg) >
                    MEAN_DELAY_RESET_THRESHOLD)
            {
                /*if the delay of the first packet of the talk-spurt is deviating from
the running_avg (i.e. mean delay) by MEAN_DELAY_RESET_THRESHOLD, then do
not apply the mean delay and reset mean delay and start over again*/
                converged = false
                running_avg = 0
                new_mean = false
                counter = 0
                init = true
            }
            else
            {
                /*apply arrival delay (e.g., the arrival delay value 142 of FIG. 1)*/
            }
        }
    }
}
```

Figure 3:
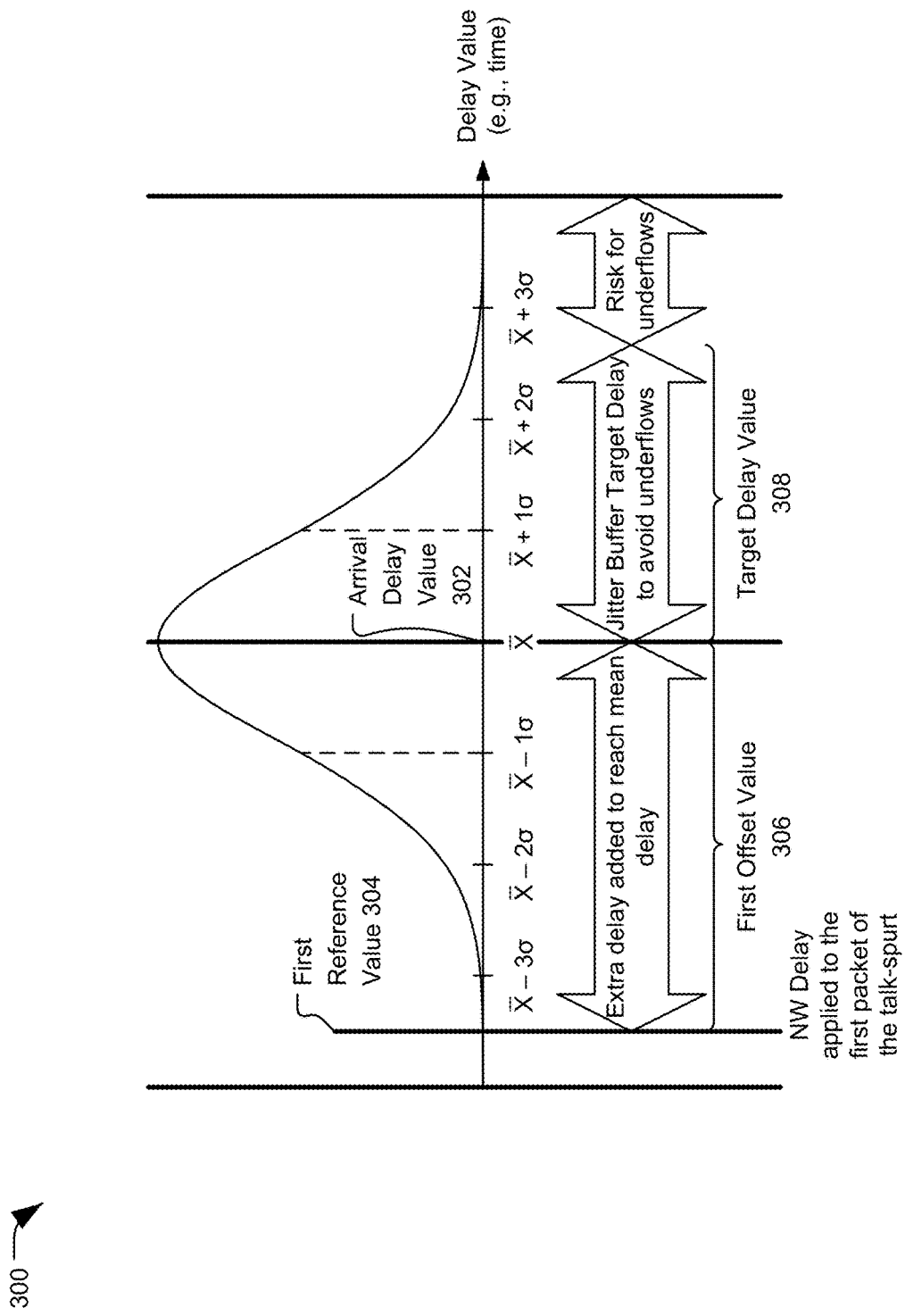
FIG. 3 illustrates a first example of adjusting a target delay value of a de-jitter buffer.

Referring to FIG. 3, a first example of adjusting a target delay value of a de-jitter buffer is shown and generally designated 300. FIG. 3 depicts a graph of a Gaussian distribution of received packets. An arrival delay value 302, such as the arrival delay value 142 of FIG. 1, may be a mean or center value of the Gaussian distribution. The graph indicates a first reference delay value 304, such as the reference delay value 144 of FIG. 1, that corresponds to an initial audio packet of a talk spurt detected by de-jitter buffer control circuitry 130. In FIG. 3, the initial audio packet arrives earlier than expected as compared to the arrival delay value 302 (e.g., the network delay associated with the initial audio packet was less than expected). The graph depicts a first offset value 306 associated with a difference between the first reference delay value 304 and the arrival delay value 302. The de-jitter buffer control circuitry 130 may adjust the target delay value 308, such as the target delay value 132, based on the comparison of the first reference delay value 304 to the arrival delay value 302. Because the initial packet arrived earlier than expected, the de-jitter buffer control circuitry 130 may add the first offset value 306 to the target delay value 308 to generate an adjusted target delay value to be applied to buffer the initial audio packet.

Figure 4:
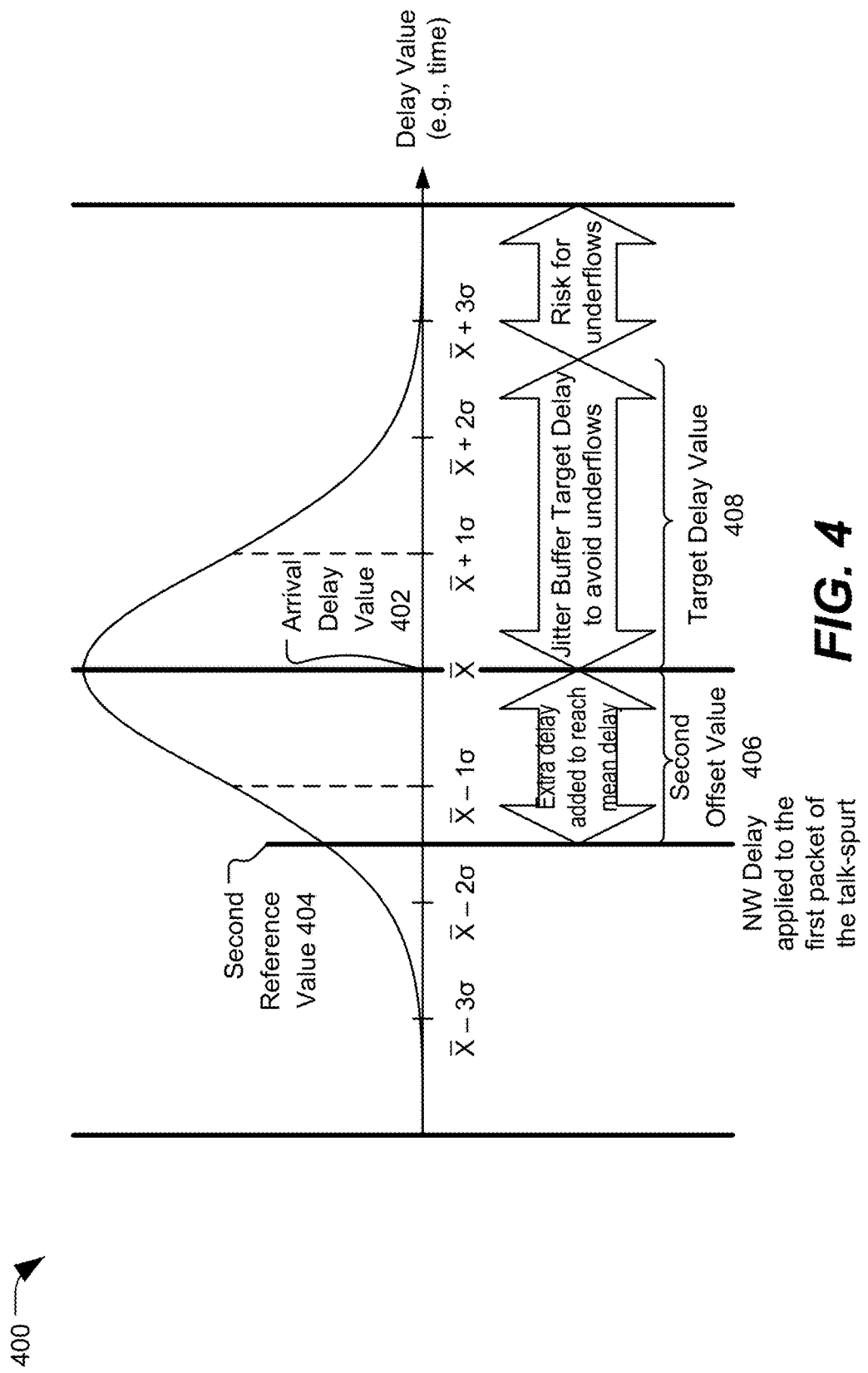
FIG. 4 illustrates a second example of adjusting a target delay value of a de-jitter buffer.

Referring to FIG. 4, a second example of adjusting a target delay value of a de-jitter buffer is shown and generally designated 400. FIG. 4 depicts a graph of a Gaussian distribution of received packets. An arrival delay value 402, such as the arrival delay value 142 of FIG. 1, may be a mean or center value of the Gaussian distribution. The graph indicates a first reference delay value 404, such as the reference delay value 144 of FIG. 1, that corresponds to an initial audio packet of a talk spurt detected by de-jitter buffer control circuitry 130. In FIG. 4, the initial audio packet arrives earlier than expected as compared to the arrival delay value 402 (e.g., the network delay associated with the intimal initial audio packet was less than expected). The graph depicts a first offset value 406 associated with a difference between the first reference delay value 404 and the arrival delay value 402. The de-jitter buffer control circuitry 130 may adjust the target delay value 408, such as the target delay value 132, based on the comparison of the first reference delay value 404 to the arrival delay value 402. Because the initial packet arrived earlier than expected, the de-jitter buffer control circuitry 130 may add the first offset value 406 to the target delay value 408 to generate an adjusted target delay value to be applied to buffer the initial audio packet. As compared to the example 300 of FIG. 3, the adjusted target delay value of FIG. 4 is less than the adjusted target delay value of FIG. 3.

Figure 5:
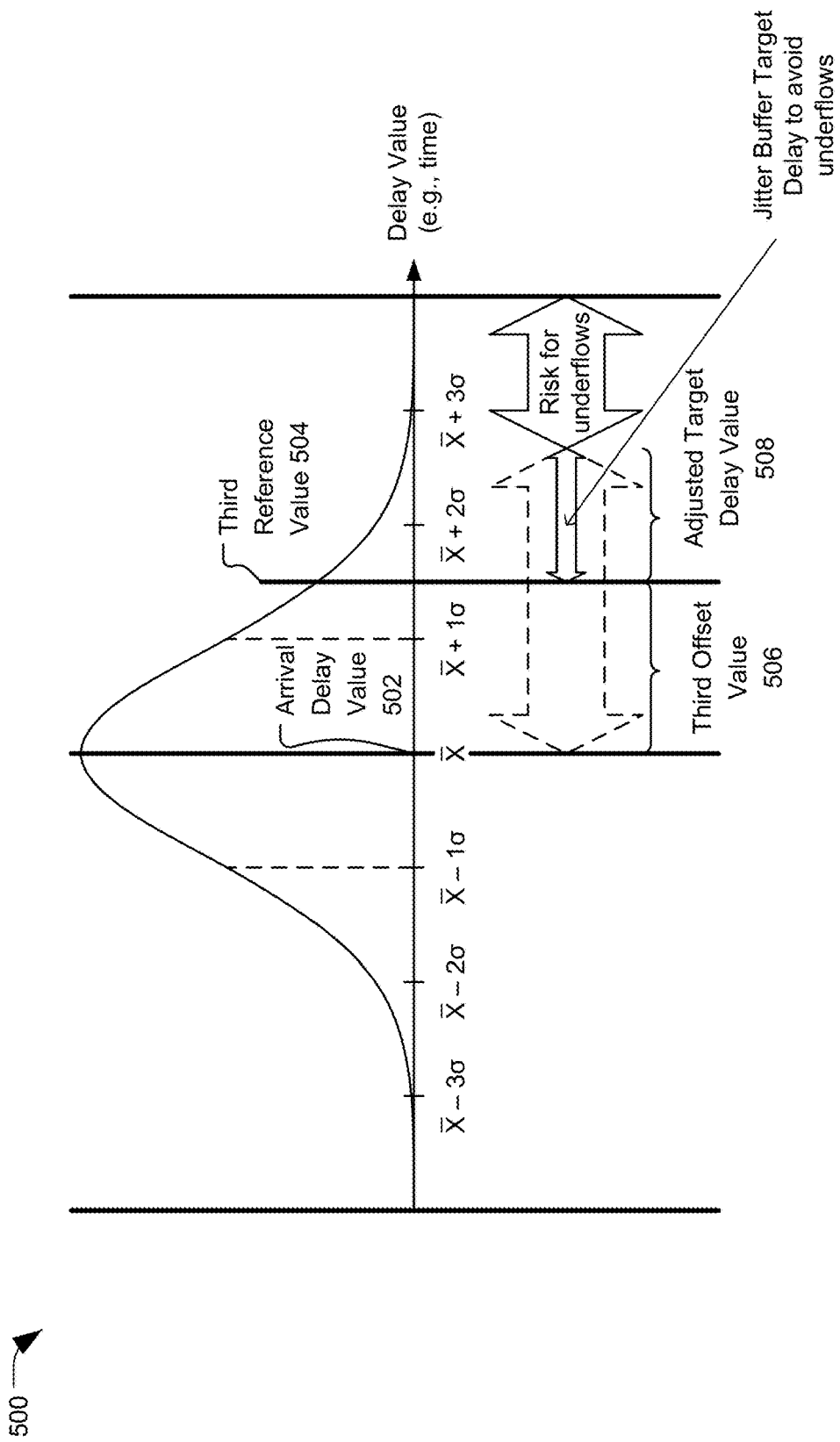
FIG. 5 illustrates a third example of adjusting a target delay value of a de-jitter buffer.

Referring to FIG. 5, a third example of adjusting a target delay value of a de-jitter buffer is shown and generally designated 500. FIG. 5 depicts a graph of a Gaussian distribution of received packets. An arrival delay value 502, such as the arrival delay value 142 of FIG. 1, may be a mean or center value of the Gaussian distribution. The graph indicates a first reference delay value 504, such as the reference delay value 144 of FIG. 1, that corresponds to an initial audio packet of a talk spurt detected by de-jitter buffer control circuitry 130. In FIG. 5, the initial audio packet arrives later than expected as compared to the arrival delay value 502 (e.g., the network delay associated with the initial audio packet was longer than expected). The graph depicts a first offset value 506 associated with a difference between the first reference delay value 504 and the arrival delay value 502. The de-jitter buffer control circuitry 130 may adjust the target delay value (indicated by the dashed double arrow), such as the target delay value 132, based on the comparison of the first reference delay value 504 to the arrival delay value 502. Because the initial packet arrived later than expected, the de-jitter buffer control circuitry 130 may subtract the first offset value 506 from the target delay value to generate an adjusted target delay value 508 to be applied to buffer the initial audio packet. As compared to the example 300 of FIG. 3 and the example 400 of FIG. 4, the adjusted target delay value of FIG. 5 is less than the adjusted target delay value of FIG. 3 and is less than the adjusted target delay value of FIG. 4.

Figure 6:
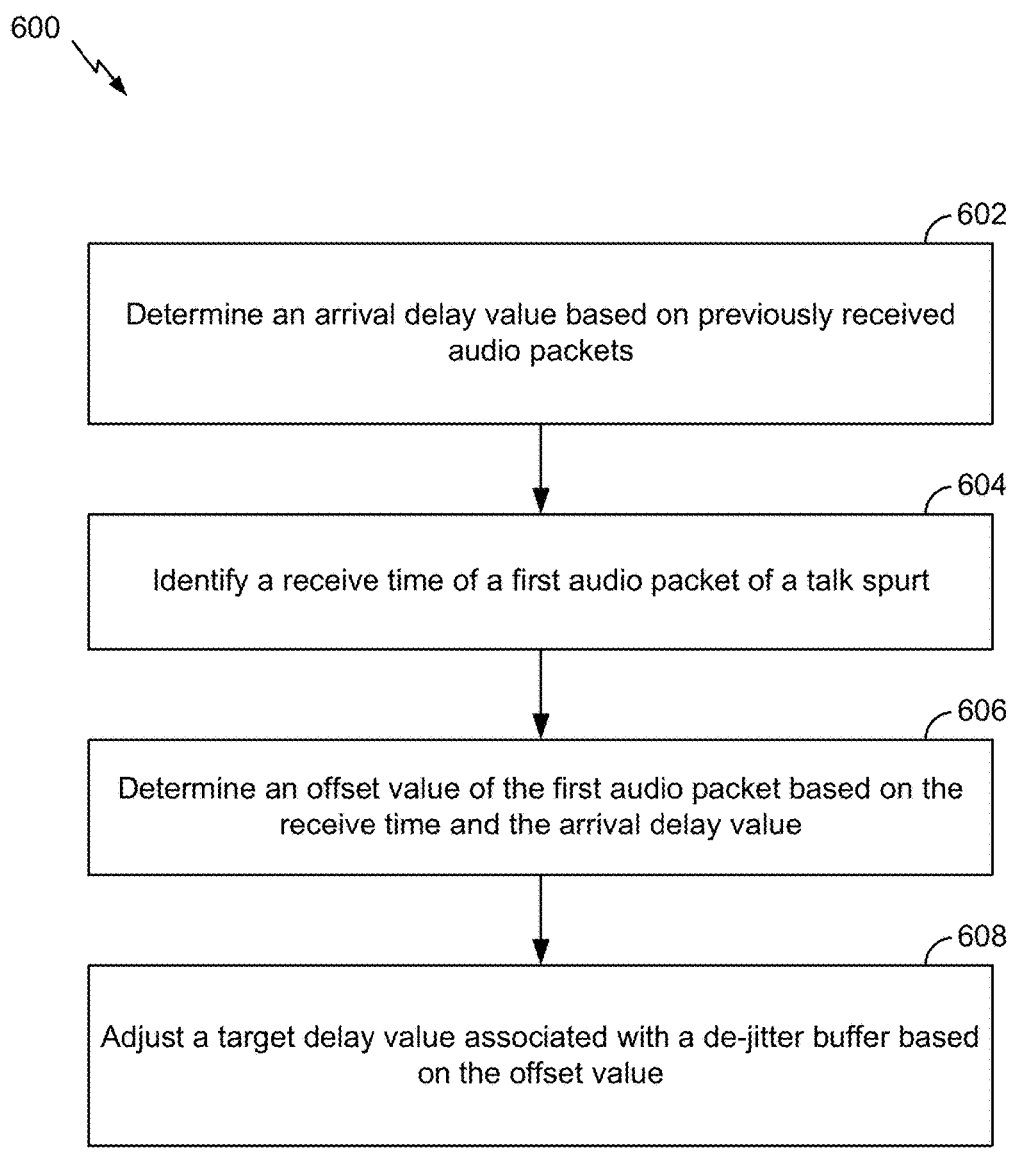
FIG. 6 is a flow chart that illustrates an illustrative method of adjusting a target delay value of a de-jitter buffer.

Referring to FIG. 6, a flow chart of an illustrative method of adjusting a target delay value of a de-jitter buffer is shown and generally designated 600. In a particular implementation, the method 600 may be performed by the system 100 (or the de-jitter buffer control circuitry 130) of FIG. 1, the first device 102, the second device 120, or another device or system, such as a mobile device or a base station.

The method 600 includes determining an arrival delay value based on previously received audio packets, at 602. For example, arrival delay value may include or correspond to the arrival delay value 142 of FIG. 1, the arrival delay value 302 of FIG. 3, the arrival delay value 402 of FIG. 4, or the arrival delay value 502 of FIG. 5. To illustrate, the de-jitter buffer control circuitry 130 of the second device 120 may determine the arrival delay value 142. The arrival delay value indicates an estimated average network delay associated with the previously received packets. In some implementations, the arrival delay value comprises an average of the reference delay values of the received audio packets. The target delay value represents an amount of time the first audio packet is buffered by the de-jitter buffer prior to output of the first audio packet from the de-jitter buffer.

The method 600 includes determining a receive time of a first audio packet of a talk spurt, at 604. The first audio packet may be an initial audio packet of the talk spurt, such as the packet p5 of FIG. 1. In some implementations, the method 600 may include detecting the first audio packet as an initial audio packet of the talk spurt. The receive time may include or correspond to a reference delay value, such as the reference delay value 144 of FIG. 1, the first reference delay value 304 of FIG. 3, the first reference delay value 404 of FIG. 4, or the first reference delay value 504 of FIG. 5.

The method 600 includes determining an offset value of the first audio packet based on the receive time and the arrival delay value, at 606. For example, the offset value may include or correspond to the offset value 148 of FIG. 1, the offset value 306 of FIG. 3, the offset value 406 of FIG. 4, or the offset value of FIG. 5.

The method 600 includes adjusting a target delay value associated with a de-jitter buffer based on the offset value, at 608. For example, the target delay value may include or correspond to the target delay value 132 of FIG. 1, the target delay value 308 of FIG. 3, the target delay value 408 of FIG. 4. Adjusting the target delay value may include increasing the target delay value or decreasing the target delay value. The adjusted target delay may include or correspond to the adjusted target delay 508 of FIG. 5. The de-jitter buffer may include or correspond to the de-jitter buffer 150 of FIG. 1.

In some implementations, the method 600 includes designating a particular received audio packet as a control frame. The method 600 may further include, for each audio packet of the received audio packets, determining a corresponding expected receive time for the audio packet based on a receive time of the control frame and identifying a corresponding receive time for the audio packet. For each audio packet of the received audio packets, a corresponding a corresponding reference delay value of the audio packet may be determined based on a difference between the corresponding expected receive time of the audio packet and the corresponding receive time of the audio packet.

In some implementations, to determine the offset value, the method 600 may include determining an expected receive time for the first audio packet based on a receive time of the control frame and identifying a received time for the first audio packet. A reference delay value, such as the reference delay value 144 of FIG. 1, of the first audio packet may be determined based on a first difference between the expected receive time of the first audio packet and the receive time of the first audio packet. A second difference may be determined between the arrival delay value and the reference delay value of the first audio packet (e.g., the arrival delay value minus the reference delay value). The offset value may correspond to (e.g., be equal to) the second difference.

In a particular implementation, the method 600 may further include determining a second arrival delay value and identifying a second receive time of a second audio packet of a second talk spurt. The second audio packet may include an initial audio packet of the second talk spurt, where the second talk spurt occurs subsequent to the talk spurt. To illustrate, the talk spurt and the second talk spurt are separated by a silence period. The method 600 may also include determining a second offset value of the second audio packet based on the second receive time and the second arrival delay value, and determining whether to drop the second audio packet based on a comparison of the second offset value to a threshold.

In some implementations, the method 600 includes determining whether to adjust a second target delay value associated with the de-jitter buffer based on the second offset value. Determining whether to adjust the second target delay value may be responsive to a determination to not drop the second audio packet. In response to a determination to adjust the second target delay value, the method 600 may include adjusting the second target delay value in response a determination that a delay (e.g., a reference delay value) corresponding to the second audio packet is greater than the second arrival delay value. Alternatively, the method 600 may include maintaining the second target delay value for the second audio packet based on a determination that a delay corresponding to the second audio packet is less than or equal to the second arrival delay value.

In some implementations, the method 600 may include dropping the second audio packet in response to a determination that the second offset value is greater than or equal to the threshold. The method 600 may further include outputting a third audio packet of the second talk spurt. The third audio packet may include a sequentially next audio packet after the second audio packet.

Thus, the method 600 of FIG. 6 enables an adjustable de-jitter buffer that reduces mouth-to-ear delay as compared to other de-jitter buffers. For example, increasing the target delay value at particular times (e.g., when the arrival delay value is greater than the reference delay value) may reduce underflow conditions, which may improve audio output quality, and reducing the target delay value at other times (e.g., when the arrival delay value is less than the reference delay value) may reduce mouth-to-ear delay, which improves user experience.

Figure 7:
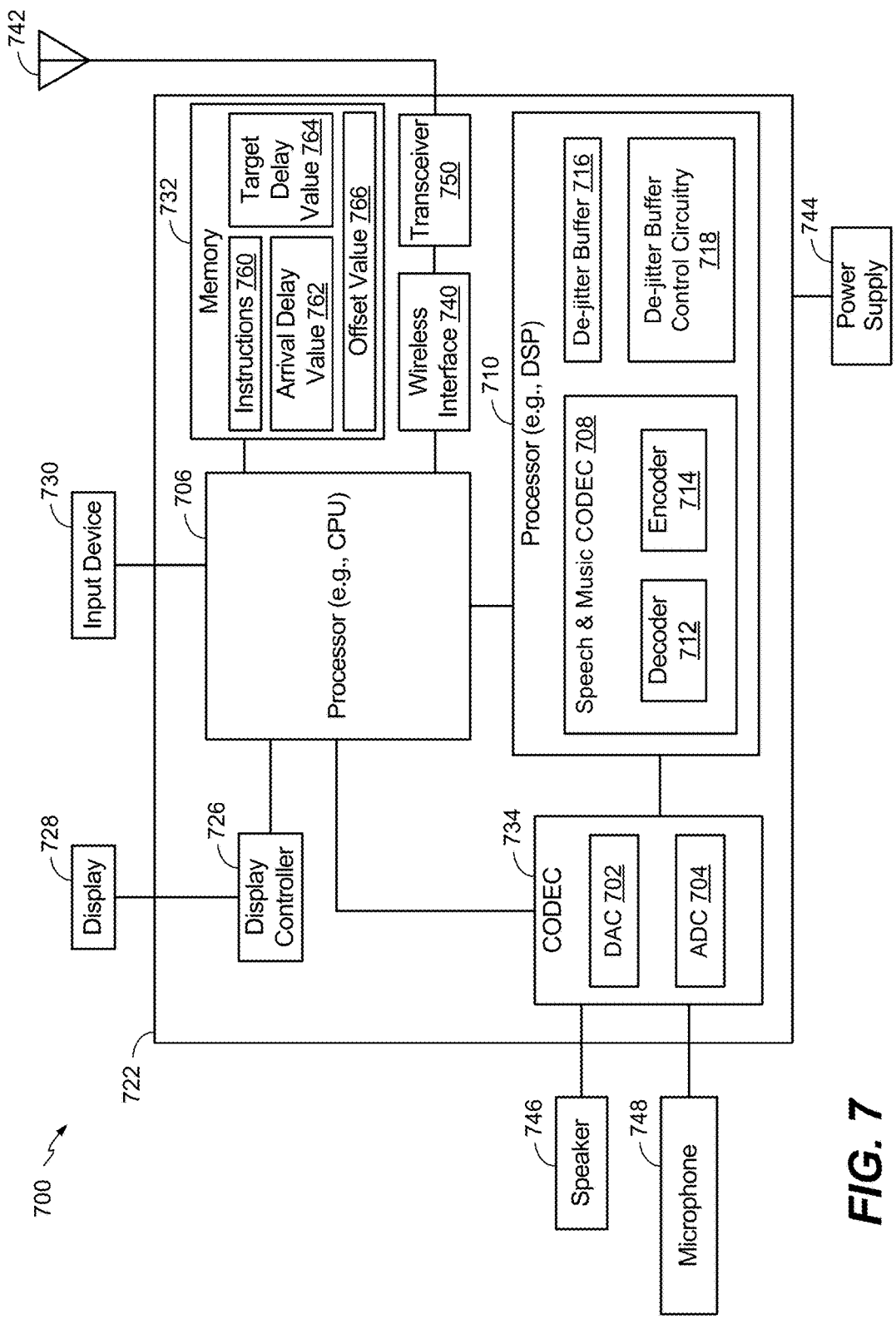
FIG. 7 is a block diagram of a wireless device that adjusts a target delay value of a de-jitter buffer.

Referring to FIG. 7, a block diagram of a particular illustrative implementation of a device (e.g., a wireless communication device) is depicted and generally designated 700. In various implementations, the device 700 may have more or fewer components than illustrated in FIG. 7. In an illustrative implementation, the device 700 may include or correspond to the first device 102 or the second device 120 of FIG. 1.

In a particular implementation, the device 700 includes a processor 706, such as a central processing unit (CPU), coupled to a memory 732. The memory 732 (e.g., a computer-readable medium) includes instructions 760 (e.g., executable instructions) such as computer-readable instructions or processor-readable instructions. The instructions 760 may include one or more instructions that are executable by a computer, such as the processor 706. The device 700 may include one or more additional processors (e.g., one or more digital signal processors (DSPs)). In the particular implementation illustrated in FIG. 7, the device 700 includes a processor 710 (e.g., a DSP). The processor 710 may include a speech and music coder-decoder (CODEC) 708. The speech and music CODEC 708 may include an encoder 714 (e.g., a vocoder encoder, a decoder 712 (e.g., a vocoder decoder), or both. In a particular implementation, the speech and music CODEC 708 may be an enhanced voice services (EVS) CODEC that communicates in accordance with one or more standards or protocols, such as a 3rd Generation Partnership Project (3GPP) EVS protocol.

The processor 710 may also include a de-jitter buffer 716 and de-jitter buffer control circuitry 718. The de-jitter buffer control circuitry 718 may control operations of the de-jitter buffer 716 based on a target delay value 764, an arrival delay value 762, and an offset value 766, or a combination thereof. For example, the de-jitter buffer control circuitry 718 may include or correspond to the de-jitter buffer control circuitry 130 of FIG. 1. The de-jitter buffer 716 may include or correspond to the de-jitter buffer 150 of FIG. 1. The target delay value 764 may include or correspond to the target delay value 132 of FIG. 1, the arrival delay value 762 may include or correspond to the arrival delay value 142 of FIG. 1, and the offset value 766 may include or correspond to the offset value 148 of FIG. 1.

FIG. 7 also illustrates that a wireless interface 740, such as a wireless controller, and a transceiver 750 may be coupled to the processor 706 and to an antenna 742, such that wireless data received via the antenna 742, the transceiver 750, and the wireless interface 740 may be provided to the processor 706 and the processor 710. In other implementations, a transmitter and a receiver may be coupled to the processor 706 and to the antenna 742.

The device 700 may include a display controller 726 that is coupled to the processor 706 and to a display 728. A coder/decoder (CODEC) 734 may also be coupled to the processor 706 and the processor 710. A speaker 746 (e.g., a speaker device) and a microphone 748 may be coupled to the CODEC 734. The CODEC 734 may include a DAC 702 and an ADC 704. In a particular implementation, the CODEC 734 may receive analog signals from the microphone 748, convert the analog signals to digital signals using the ADC 704, and provide the digital signals to the speech and music CODEC 708. The speech and music CODEC 708 may process the digital signals. In a particular implementation, the speech and music CODEC 708 may provide digital signals to the CODEC 734. The CODEC 734 may convert the digital signals to analog signals using the DAC 702 and may provide the analog signals to the speaker 746.

In some implementations, the processor 706, the processor 710, the display controller 726, the memory 732, the CODEC 734, the wireless interface 740, and the transceiver 750 are included in a system-in-package or system-on-chip device 722. In some implementations, an input device 730 and a power supply 744 are coupled to the system-on-chip device 722. Moreover, in a particular implementation, as illustrated in FIG. 7, the display 728, the input device 730, the speaker 746, the microphone 748, the antenna 742, and the power supply 744 are external to the system-on-chip device 722. In a particular implementation, each of the display 728, the input device 730, the speaker 746, the microphone 748, the antenna 742, and the power supply 744 may be coupled to a component of the system-on-chip device 722, such as an interface or a controller.

In a particular implementation, the device 700 includes receive circuitry (e.g., the antenna 742, the transceiver 750, the wireless interface 740, etc.) configured to receive a plurality of audio packets, such as the plurality of audio packets 116 of FIG. 1. The device 700 also includes the de-jitter buffer control circuitry 718 that is configured to operate as described with respect to the de-jitter buffer control circuitry 130 of FIG. 1.

In an illustrative implementation, the memory 732 (e.g., a computer-readable storage device) includes or stores the instructions 760 (e.g., executable instructions), such as computer-readable instructions or processor-readable instructions. For example, the memory 732 may include or correspond to a non-transitory computer readable medium storing the instructions 760. The instructions 760 may include one or more instructions that are executable by a computer, such as the processor 706 or the processor 710. The instructions 760 may cause the processor 706 or the processor 710 to perform operations as described with reference to FIGS. 1-5, the method 600 of FIG. 6, or a combination thereof.

In a particular implementation, the instructions 760, when executed by the processor 706 or the processor 710, may cause the processor 706 or the processor 710 to determine the arrival delay value 762 based on previously received audio packets. The instructions 760 may also cause the processor 706 or the processor 710 to identify a receive time of a first audio packet of a talk spurt and to determine the offset value 766 of the first audio packet based on the receive time and the arrival delay value 762. The instructions 760 may also cause the processor 706 or the processor 710 to adjust the target delay value 764 associated with the de-jitter buffer 716 based on the offset value 766.

One or more of the disclosed aspects may be implemented in a system or an apparatus, such as the device 700, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 700 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Figure 8:
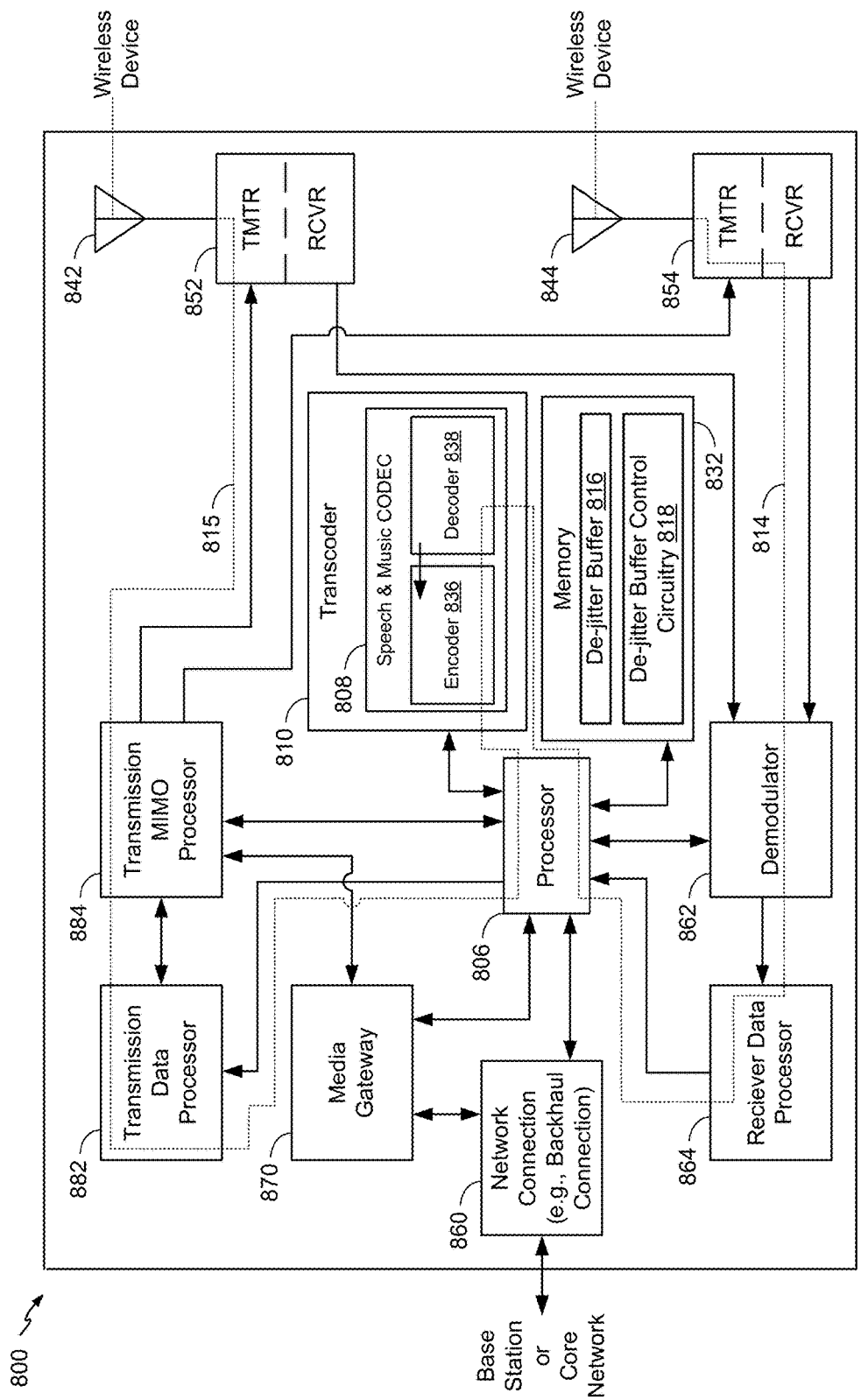
FIG. 8 is a block diagram of a base station that adjusts a target delay value of a de-jitter buffer.

Referring to FIG. 8, a block diagram of a particular illustrative example of a base station 800 is depicted. In various implementations, the base station 800 may have more components or fewer components than illustrated in FIG. 8. In an illustrative example, the base station 800 may include the first device 102 of FIG. 1 or the second device 120 of FIG. 1. In an illustrative example, the base station 800 may operate according to the method 600 of FIG. 6.

The base station 800 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 700 of FIG. 7.

Various functions may be performed by one or more components of the base station 800 (and/or in other components not shown), such as sending and receiving messages and data (e.g., audio data). In a particular example, the base station 800 includes a processor 806 (e.g., a CPU). The base station 800 may include a transcoder 810. The transcoder 810 may include a speech and music CODEC 808. For example, the transcoder 810 may include one or more components (e.g., circuitry) configured to perform operations of the speech and music CODEC 808. As another example, the transcoder 810 may be configured to execute one or more computer-readable instructions to perform the operations of the speech and music CODEC 808. The speech and music CODEC 808 may include an encoder 836 and a decoder 838. Although the speech and music CODEC 808 is illustrated as a component of the transcoder 810, in other examples one or more components of the speech and music CODEC 808 may be included in the processor 806, another processing component, or a combination thereof. For example, the decoder 838 (e.g., a vocoder decoder) may be included in a receiver data processor 864. As another example, the encoder 836 (e.g., a vocoder encoder) may be included in a transmission data processor 882.

The transcoder 810 may function to transcode messages and data between two or more networks. The transcoder 810 may be configured to convert message and audio data from a first format (e.g., a digital format) to a second format. To illustrate, the decoder 838 may decode encoded signals having a first format and the encoder 836 may encode the decoded signals into encoded signals having a second format. Additionally, or alternatively, the transcoder 810 may be configured to perform data rate adaptation. For example, the transcoder 810 may downconvert a data rate or upconvert the data rate without changing a format the audio data. To illustrate, the transcoder 810 may downconvert 64 kbit/s signals into 16 kbit/s signals.

The base station 800 may include a memory 832 that includes a de-jitter buffer 816 and de-jitter buffer control circuitry 818. In a particular implementation, the de-jitter buffer 816 corresponds to the de-jitter buffer 150 of FIG. 1 and the de-jitter buffer control circuitry 818 corresponds to the de-jitter buffer control circuitry 130 of FIG. 1. The memory 832, such as a computer-readable storage device, may include instructions. The instructions may include one or more instructions that are executable by the processor 806, the transcoder 810, or a combination thereof, to perform the method 600 of FIG. 6. The base station 800 may include multiple transmitters and receivers (e.g., transceivers), such as a first transceiver 852 and a second transceiver 854, coupled to an array of antennas. The array of antennas may include a first antenna 842 and a second antenna 844. The array of antennas may be configured to wirelessly communicate with one or more wireless devices, such as the device 700 of FIG. 7. For example, the second antenna 844 may receive a data stream 814 (e.g., a bit stream) from a wireless device. The data stream 814 may include messages, data (e.g., encoded speech data), or a combination thereof.

The base station 800 may include a network connection 860, such as backhaul connection. The network connection 860 may be configured to communicate with a core network or one or more base stations of the wireless communication network. For example, the base station 800 may receive a second data stream (e.g., messages or audio data) from a core network via the network connection 860. The base station 800 may process the second data stream to generate messages or audio data and provide the messages or the audio data to one or more wireless device via one or more antennas of the array of antennas or to another base station via the network connection 860. In a particular implementation, the network connection 860 may be a wide area network (WAN) connection, as an illustrative, non-limiting example. In some implementations, the core network may include or correspond to a Public Switched Telephone Network (PSTN), a packet backbone network, or both.

The base station 800 may include a media gateway 870 that is coupled to the network connection 860 and the processor 806. The media gateway 870 may be configured to convert between media streams of different telecommunications technologies. For example, the media gateway 870 may convert between different transmission protocols, different coding schemes, or both. To illustrate, the media gateway 870 may convert from PCM signals to Real-Time Transport Protocol (RTP) signals, as an illustrative, non-limiting example. The media gateway 870 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 870 may include a transcoder, such as the transcoder 810, and may be configured to transcode data when codecs are incompatible. For example, the media gateway 870 may transcode between an Adaptive Multi-Rate (AMR) codec and a G.711 codec, as an illustrative, non-limiting example. The media gateway 870 may include a router and a plurality of physical interfaces. In some implementations, the media gateway 870 may also include a controller (not shown). In a particular implementation, the media gateway controller may be external to the media gateway 870, external to the base station 800, or both. The media gateway controller may control and coordinate operations of multiple media gateways. The media gateway 870 may receive control signals from the media gateway controller and may function to bridge between different transmission technologies and may add service to end-user capabilities and connections.

The base station 800 may include a demodulator 862 that is coupled to the transceivers 852, 854, the receiver data processor 864, and the processor 806, and the receiver data processor 864 may be coupled to the processor 806. The demodulator 862 may be configured to demodulate modulated signals received from the transceivers 852, 854 and to provide demodulated data to the receiver data processor 864. The receiver data processor 864 may be configured to extract a message or audio data from the demodulated data and send the message or the audio data to the processor 806.

The base station 800 may include a transmission data processor 882 and a transmission multiple input-multiple output (MIMO) processor 884. The transmission data processor 882 may be coupled to the processor 806 and the transmission MIMO processor 884. The transmission MIMO processor 884 may be coupled to the transceivers 852, 854 and the processor 806. In some implementations, the transmission MIMO processor 884 may be coupled to the media gateway 870. The transmission data processor 882 may be configured to receive the messages or the audio data from the processor 806 and to code the messages or the audio data based on a coding scheme, such as CDMA or orthogonal frequency-division multiplexing (OFDM), as illustrative, non-limiting examples. The transmission data processor 882 may provide the coded data to the transmission MIMO processor 884.

The coded data may be multiplexed with other data, such as pilot data, using CDMA or OFDM techniques to generate multiplexed data. The multiplexed data may then be modulated (i.e., symbol mapped) by the transmission data processor 882 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 806.

The transmission MIMO processor 884 may be configured to receive the modulation symbols from the transmission data processor 882 and may further process the modulation symbols and may perform beamforming on the data. For example, the transmission MIMO processor 884 may apply beamforming weights to the modulation symbols. The beamforming weights may correspond to one or more antennas of the array of antennas from which the modulation symbols are transmitted.

During operation, the second antenna 844 of the base station 800 may receive a data stream 814. The second transceiver 854 may receive the data stream 814 from the second antenna 844 and may provide the data stream 814 to the demodulator 862. The demodulator 862 may demodulate modulated signals of the data stream 814 and provide demodulated data to the receiver data processor 864. The receiver data processor 864 may extract audio data from the demodulated data and provide the extracted audio data to the processor 806.

The data stream 814 or the extracted audio data may include or correspond to a plurality of audio packets (e.g., the plurality of audio packets 116). The de-jitter buffer control circuitry 818 may store (or drop) packets of the plurality of audio packets at the de-jitter buffer 816 based on operational parameters associated with the de-jitter buffer 816, a delay metric, or a combination thereof. The de-jitter buffer control circuitry 818 may adjust the operational parameters based on estimated jitter and an underflow rate associated with audio packets received and stored at the de-jitter buffer 816. In some implementations, the de-jitter buffer control circuitry 818 may adjust a target delay value of the de-jitter buffer 816 based on a determined arrival delay value, such as the arrival delay value 142 of FIG. 1.

The processor 806 may provide the audio data (e.g., audio packets or audio frames stored in the de-jitter buffer 816) to the transcoder 810 for transcoding. The decoder 838 of the transcoder 810 may decode the audio data from a first format into decoded audio data and the encoder 836 may encode the decoded audio data into a second format. In some implementations, the encoder 836 may encode the audio data using a higher data rate (e.g., upconvert) or a lower data rate (e.g., downconvert) than received from the wireless device. In other implementations, the audio data may not be transcoded. Although transcoding (e.g., decoding and encoding) is illustrated as being performed by a transcoder 810, the transcoding operations (e.g., decoding and encoding) may be performed by multiple components of the base station 800. For example, decoding may be performed by the receiver data processor 864 and encoding may be performed by the transmission data processor 882. In other implementations, the processor 806 may provide the audio data to the media gateway 870 for conversion to another transmission protocol, coding scheme, or both. The media gateway 870 may provide the converted data to another base station or core network via the network connection 860.

Encoded audio data generated at the encoder 836, such as transcoded data, may be provided to the transmission data processor 882 or the network connection 860 via the processor 806. The transcoded audio data from the transcoder 810 may be provided to the transmission data processor 882 for coding according to a modulation scheme, such as OFDM, to generate the modulation symbols. The transmission data processor 882 may provide the modulation symbols to the transmission MIMO processor 884 for further processing and beamforming. The transmission MIMO processor 884 may apply beamforming weights and may provide the modulation symbols to one or more antennas of the array of antennas, such as the first antenna 842 via the first transceiver 852. Thus, the base station 800 may provide a transcoded data stream 815, that corresponds to the data stream 814 received from the wireless device, to another wireless device. The transcoded data stream 815 may have a different encoding format, data rate, or both, from the data stream 814. In other implementations, the transcoded data stream 815 may be provided to the network connection 860 for transmission to another base station or a core network.

The base station 800 may therefore include a computer-readable storage device (e.g., the memory 832) storing instructions that, when executed by a processor (e.g., the processor 806 or the transcoder 810), cause the processor to perform operations including determine the arrival delay value based on previously received audio packets. The instructions may also cause the processor to identify a receive time of a first audio packet of a talk spurt and to determine the offset value of the first audio packet based on the receive time and the arrival delay time. The instructions may also cause the processor to adjust the target delay value associated with the de-jitter buffer based on the offset value.

In conjunction with the described aspects, an apparatus includes means for determining the arrival delay value based on previously received audio packets. The means for determining the arrival value may include or correspond to the processor 126 of FIG. 1, the de-jitter buffer control circuitry 130 of FIG. 1, the de-jitter buffer 150 of FIG. 1, the de-jitter buffer 716 of FIG. 7, the de-jitter buffer control circuitry 718 of FIG. 7, the de-jitter buffer control circuitry 818 of FIG. 8, the de-jitter buffer 816 of FIG. 8, one or more other structures or circuits configured to determine the arrival delay, or any combination thereof.

The apparatus further includes means for identifying a receive time of a first audio packet of a talk spurt. The means for identifying may include or correspond to the processor 126 of FIG. 1, the de-jitter buffer control circuitry 130 of FIG. 1, the de-jitter buffer 150 of FIG. 1, the de-jitter buffer 716 of FIG. 7, the de-jitter buffer control circuitry 718 of FIG. 7, the de-jitter buffer control circuitry 818 of FIG. 8, the de-jitter buffer 816 of FIG. 8, one or more other structures or circuits configured to identify the receive time, or any combination thereof.

The apparatus further includes means for determining an offset value of the first audio packet based on the receive time and the arrival delay value. The means for determining the offset value may include or correspond to the processor 126 of FIG. 1, the de-jitter buffer control circuitry 130 of FIG. 1, the de-jitter buffer 150 of FIG. 1, the de-jitter buffer 716 of FIG. 7, the de-jitter buffer control circuitry 718 of FIG. 7, the de-jitter buffer control circuitry 818 of FIG. 8, the de-jitter buffer 816 of FIG. 8, one or more other structures or circuits configured to determine the offset value, or any combination thereof.

The apparatus further includes means for adjusting a target delay value associated with means for buffering, the target delay value adjusted based on the offset value. The means for adjusting may include or correspond to the processor 126 of FIG. 1, the de-jitter buffer control circuitry 130 of FIG. 1, the de-jitter buffer 150 of FIG. 1, the de-jitter buffer 716 of FIG. 7, the de-jitter buffer 816 of FIG. 8, one or more other structures or circuits configured to adjust the target delay value, or any combination thereof. The means for buffering may include or correspond to the de-jitter buffer 150 of FIG. 1, the de-jitter buffer 716 of FIG. 7, the de-jitter buffer control circuitry 718 of FIG. 7, the de-jitter buffer control circuitry 818 of FIG. 8, the de-jitter buffer 816 of FIG. 8, one or more other structures or circuits configured to buffer, or any combination thereof.

In some implementations, the means for determining the arrival delay value, the means for identifying the receive time, the, means for determining the offset value, and the means for adjusting the target delay value are integrated into a mobile device. In other implementations, the means for determining the arrival delay value, the means for identifying the receive time, the, means for determining the offset value, and the means for adjusting the target delay value are integrated into a base station.

Although one or more of FIGS. 1-8 may illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. For example, one or more elements of the method 600 of FIG. 6 may be performed in combination with other operations described herein. Accordingly, no single implementation described herein should be construed as limiting and implementations of the disclosure may be suitably combined without departing form the teachings of the disclosure. As an example, one or more operations described with reference to FIG. 6 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
    de-jitter buffer control circuitry configured to determine an arrival delay value based on previously received audio packets, to identify a receive time of a first audio packet of a talk spurt, to determine an offset value of the first audio packet based on the receive time and the arrival delay value, and to adjust a target delay value associated with a de-jitter buffer in response to determining that a difference between a first delay value of a first particular subset of the previously received audio packets and a second delay value of a second particular subset of the previously received audio packets satisfies a convergence threshold, the target delay value adjusted based on the offset value; and
    a de-jitter buffer configured to output the first audio packet at a first playout time and to output a second audio packet of the talk spurt at a second playout time, the first playout time based on the adjusted target delay value and the second playout time based on the first playout time and a playout rate.

2. The apparatus of claim 1, wherein the arrival delay value indicates an estimated average network delay associated with the previously received audio packets, wherein the adjusted target delay value represents an amount of time the first audio packet is buffered by the de-jitter buffer prior to output of the first audio packet from the de-jitter buffer.

3. The apparatus of claim 1, wherein the de-jitter buffer control circuitry is further configured to:
    designate a particular received audio packet as a control frame; and
    for each audio packet of the previously received audio packets:
        determine a corresponding expected receive time for the audio packet based on a receive time of the control frame;
        identify a corresponding receive time for the audio packet; and
        determine a corresponding reference delay value of the audio packet based on a difference between the corresponding expected receive time of the audio packet and the corresponding receive time of the audio packet.

4. The apparatus of claim 3, wherein the arrival delay value comprises an average of the reference delay values of the previously received audio packets.

5. The apparatus of claim 3, wherein the de-jitter buffer control circuitry is further configured to:
    determine an expected receive time for the first audio packet based on a receive time of the control frame;
    identify a received time for the first audio packet;
    determine a reference delay value of the first audio packet based on a first difference between the expected receive time of the first audio packet and the receive time of the first audio packet; and
    determine a second difference between the arrival delay value and the reference delay value of the first audio packet, wherein the offset value corresponds to the second difference.

6. The apparatus of claim 5, further comprising a speaker device configured to, in response to receiving the first audio packet from the de-jitter buffer at the first playout time, output an audio representation of the first audio packet, wherein the de-jitter buffer control circuitry is configured to, in response to determining that the arrival delay value is less than the reference delay value of the first audio packet, generate the adjusted target delay value by decreasing the target delay value.

7. The apparatus of claim 1, further comprising a receiver configured to receive the first audio packet.

8. The apparatus of claim 1, wherein the first audio packet comprises an initial audio packet of the talk spurt.

9. The apparatus of claim 1, further comprising:
    an antenna; and
    a receiver coupled to the antenna and configured to receive the audio packets and to provide the audio packets to the de-jitter buffer control circuitry.

10. The apparatus of claim 1, wherein the de-jitter buffer control circuitry and the de-jitter buffer are included in a mobile communication device.

11. The apparatus of claim 1, wherein the de-jitter buffer control circuitry and the de-jitter buffer are included in a base station.

12. A method comprising:
- determining, at a device, an arrival delay value based on previously received audio packets;
- identifying a receive time of a first audio packet of a talk spurt;
- determining an offset value of the first audio packet based on the receive time and the arrival delay value;
- adjusting a target delay value associated with a de-jitter buffer of the device in response to determining that a difference between a first delay value of a first particular subset of the previously received audio packets and a second delay value of a second particular subset of the previously received audio packets satisfies a convergence threshold, the target delay value adjusted based on the offset value;
- outputting the first audio packet at a first playout time, the first playout time based on the adjusted target delay value; and
- outputting a particular audio packet of the talk spurt at a second playout time, the second playout time based on the first playout time and a playout rate.

13. The method of claim 12, further comprising detecting the first audio packet as an initial audio packet of the talk spurt.

14. The method of claim 12, wherein adjusting the target delay value comprises increasing the target delay value.

15. The method of claim 12, wherein adjusting the target delay value comprises decreasing the target delay value.

16. The method of claim 12, further comprising:
- determining a second arrival delay value; and
- identifying a second receive time of a second audio packet of a second talk spurt.

17. The method of claim 16, further comprising:
- determining a second offset value of the second audio packet based on the second receive time and the second arrival delay value; and
- determining whether to drop the second audio packet based on a comparison of the second offset value to a threshold.

18. The method of claim 17, further comprising determining whether to adjust a second target delay value associated with the de-jitter buffer based on the second offset value.

19. The method of claim 18, further comprising maintaining the second target delay value for the second audio packet based on a determination that a delay corresponding to the second audio packet is less than or equal to the second arrival delay value.

20. The method of claim 18, further comprising adjusting the second target delay value in response a determination that a delay corresponding to the second audio packet is greater than the second arrival delay value.

21. The method of claim 17, further comprising dropping the second audio packet in response to a determination that the second offset value is greater than or equal to the threshold.

22. The method of claim 21, wherein the second audio packet comprises an initial audio packet of the second talk spurt.

23. The method of claim 21, further comprising outputting a third audio packet of the second talk spurt, wherein the third audio packet comprises a sequentially next audio packet after the second audio packet.

24. The method of claim 12, wherein the device comprises a mobile device or a base station.

25. A computer-readable storage device storing instructions that, when executed by a processor, cause the processor to perform operations comprising:
- determining an arrival delay value based on previously received audio packets;
- identifying a receive time of a first audio packet of a talk spurt;
- determining an offset value of the first audio packet based on the receive time and the arrival delay value;
- adjusting a target delay value associated with a de-jitter buffer, the target delay value adjusted in response to determining that a difference between a first delay value of a first particular subset of the previously received audio packets and a second delay value of a second particular subset of the previously received audio packets satisfies a convergence threshold, the target delay value adjusted based on the offset value;
- outputting the first audio packet at a first playout time, the first playout time based on the adjusted target delay value; and
- outputting a particular audio packet of the talk spurt at a second playout time, the second playout time based on the first playout time and a playout rate.

26. The computer-readable storage device of claim 25, wherein the instructions, when executed by the processor, further cause the processor to perform the operations comprising, in response to identifying the first audio packet of the talk spurt:
- determining the first delay value as a first converged value based on first reference delay values of the first particular subset of the previously received audio packets, a reference delay value of an audio packet based on a difference between a receive time of the audio packet and an expected receive time of the audio packet; and
- determining the second delay value as a second converged value based on second reference delay values of the second particular subset of the previously received audio packets.

27. The computer-readable storage device of claim 25, wherein the arrival delay value is further based on a receive time of the first audio packet.

28. An apparatus comprising:
- means for determining an arrival delay value based on previously received audio packets;
- means for identifying a receive time of a first audio packet of a talk spurt;
- means for determining an offset value of the first audio packet based on the receive time and the arrival delay value;
- means for adjusting a target delay value associated with means for buffering, the target delay value adjusted in response to a determination that a difference between a first delay value of a first particular subset of the previously received audio packets and a second delay value of a second particular subset of the previously received audio packets satisfies a convergence threshold, the target delay value adjusted based on the offset value;
- means for outputting the first audio packet at a first playout time, the first playout time based on the adjusted target delay value; and
- means for outputting a particular audio packet of the talk spurt at a second playout time, the second playout time based on the first playout time and a playout rate.

29. The apparatus of claim 28, wherein the means for determining the arrival delay value, the means for identifying the receive time, the means for determining the offset value, the means for adjusting the target delay value, the means for outputting the first audio packet, and the means for outputting the particular audio packet are integrated into a mobile device.

30. The apparatus of claim 28, wherein the means for determining the arrival delay value, the means for identifying the receive time, the, means for determining the offset value, the means for adjusting the target delay value, the means for outputting the first audio packet, and the means for outputting the particular audio packet are integrated into a base station.

\* \* \* \* \*